United States Patent
Furusawa

(10) Patent No.: US 7,606,454 B2
(45) Date of Patent: Oct. 20, 2009

(54) OPTICAL FIBER ARRAY, OPTICAL COMPONENT AND OPTICAL SWITCH USING THE OPTICAL FIBER ARRAY

(75) Inventor: Mitsuyasu Furusawa, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 11/678,153

(22) Filed: Feb. 23, 2007

(65) Prior Publication Data

US 2007/0201807 A1 Aug. 30, 2007

(30) Foreign Application Priority Data

Feb. 24, 2006 (JP) ............................. 2006-048295
Aug. 31, 2006 (JP) ............................. 2006-234970

(51) Int. Cl.
*G02B 6/04* (2006.01)
*G02B 6/00* (2006.01)

(52) U.S. Cl. ........................................ 385/120; 385/137
(58) Field of Classification Search ................. 385/120, 385/134, 136–138
See application file for complete search history.

(56) References Cited

U.S. PATENT DOCUMENTS

| 5,135,590 | A | 8/1992 | Basavanhally et al. |
| 6,522,817 | B2 * | 2/2003 | Moran ........................ 385/120 |
| 6,633,719 | B2 | 10/2003 | Basavanhally et al. |
| 6,690,875 | B2 | 2/2004 | Moran |
| 6,823,127 | B2 * | 11/2004 | Nasiri et al. ................. 385/137 |
| 2004/0234222 | A1 * | 11/2004 | Kuroda et al. ............... 385/129 |

FOREIGN PATENT DOCUMENTS

JP 2004-271656 9/2004

* cited by examiner

*Primary Examiner*—Uyen Chau N Le
*Assistant Examiner*—John M Bedtelyon
(74) *Attorney, Agent, or Firm*—Antonelli, Terry, Stout & Kraus, LLP.

(57) ABSTRACT

An optical fiber array for insertion-positioning and arranging coated optical fibers in a substrate, in which a plurality of through-holes are formed, wherein a coating of a tip of the coated optical fiber is removed to expose a optical fiber, and wherein with the use of three substrates, the optical fiber of the coated optical fiber is inserted into through-holes of the first and second substrates and is positioned, and the coating of the coated optical fiber is inserted into a through-hole of the third substrate and is positioned.

21 Claims, 8 Drawing Sheets

| | NUMBER OF BROKEN OPTICAL FIBERS | DEGREE OF PARALLELISM OF EMITTED LIGHT |
|---|---|---|
| PRESENT EMBODIMENT | ZERO | ±1° |
| COMPARATIVE EXAMPLE 1 | 7 PIECES | ±1° |
| COMPARATIVE EXAMPLE 2 | ZERO | ±1.6° |

FIG.7
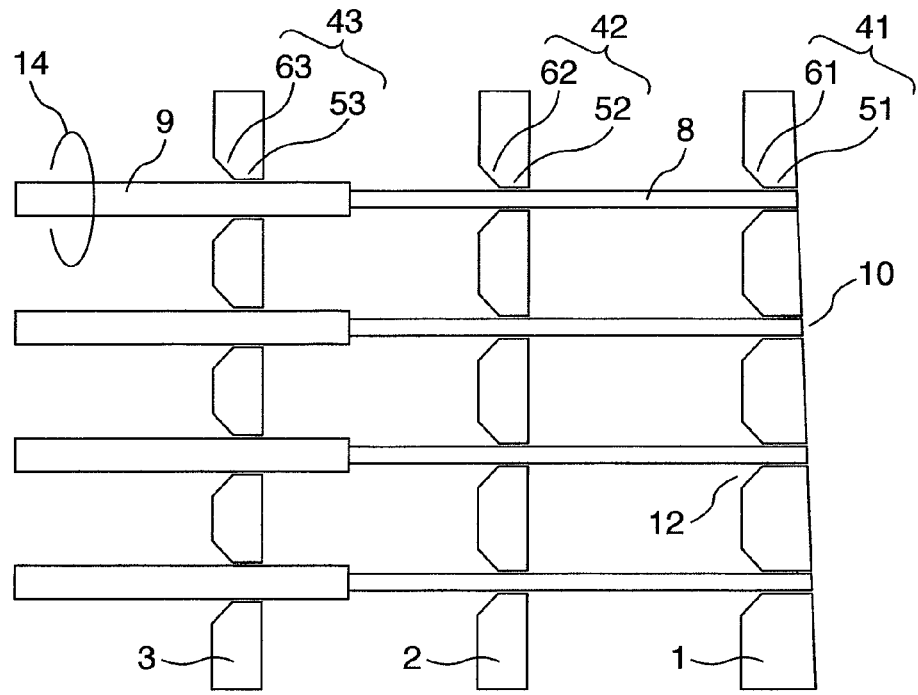
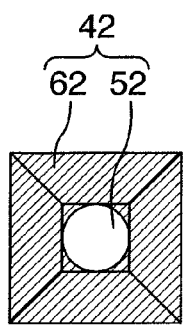
FIG.8A
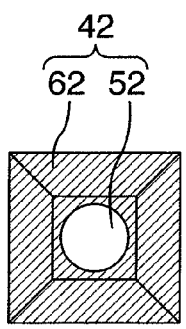
FIG.8B
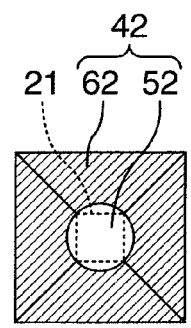
FIG.8C
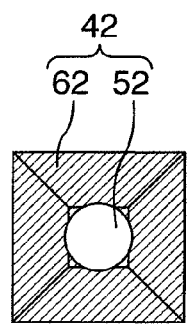
FIG.8D
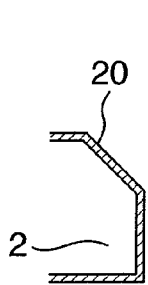
FIG.9A
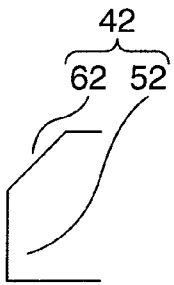
FIG.9B
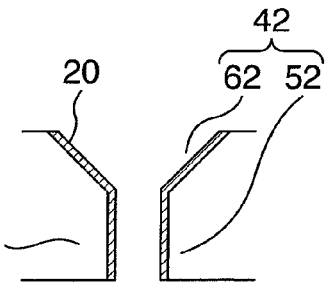
FIG.9C

OPTICAL FIBER ARRAY, OPTICAL COMPONENT AND OPTICAL SWITCH USING THE OPTICAL FIBER ARRAY

BACKGROUND OF THE INVENTION

The present invention relates to optical fiber arrays, in which a plurality of coated optical fibers are arranged, the optical fiber arrays being widely used in optical components, optical system, and the like, and particularly relates to optical fiber arrays having the end face of the coated optical fibers arranged in two dimensions, and furthermore, the present invention relates to optical components, such as an optical switch, using the optical fiber array.

In order to transmit and receive a large capacity of information at high speed, the optical fiber communications system has received attention. Today, coated optical fibers are installed not only between base stations in a big city, but even to terminals of each office building and each home, and dense optical fiber networks have been currently established. In relay points in the optical fiber network, a plurality of coated optical fibers are put together and the connection and switching of optical paths are carried out. In carrying out these connection and switching, the coated optical fibers are connected to filter elements or switching elements. In this case, the coated optical fibers are not fixed individually, but as an optical fiber array having the coated optical fibers arranged therein a plurality of coated optical fibers are handled and fixed simultaneously, thereby improving the working efficiency.

Although the conventional optical fiber array is a one-dimensional optical fiber array having coated optical fibers arranged as to align the end faces of the coated optical fiber in a line, high density arrangement is demanded due to an increase in the channel capacity and to the miniaturization of elements in recent years, and a two-dimensional optical fiber array having the end faces of coated optical fibers arranged in two dimensions is desirable.

As for the structure of the two-dimensional optical fiber array, it is known that three substrates are used for holding the optical fiber array (for example, U.S. Pat. No. 6,690,875 (FIG. 4, columns 6-7)). In U.S. Pat. No. 6,690,875 (FIG. 4, columns 6-7), an optical fiber inclined by an angle α is inserted into a hole of a housing entry substrate, and a coating portion of the coated optical fiber is bent by means of a hole of an angle alignment substrate, and then an optical fiber portion of the coated optical fiber, the optical fiber portion being exposed by removing the coating, is inserted into a hole (aperture) of a primary substrate and is fixed.

As for other structure of the two-dimensional optical fiber array, it is known that two substrates are used for holding fibers (for example, U.S. Pat. No. 5,135,590 (FIG. 1, columns 3-5). In U.S. Pat. No. 5,135,590 (FIG. 1, columns 3-5), the optical fiber of an coated optical fiber is passed through a hole (aperture) of a guiding plate, and the tip of the optical fiber of the coated optical fiber is passed through a hole (aperture) of a securing plate and is fixed.

As for other structure of the two-dimensional optical fiber array, it is known that three substrates are used for holding the optical fiber of a fiber (for example, U.S. Pat. No. 6,633,719 (FIG. 6, FIG. 7, from line 55 in column 5 to line 19 of column 6). In the method of U.S. Pat. No. 6,633,719 (FIG. 6, FIG. 7, from line 55 in column 5 to line 19 of column 6), the optical fiber of an coated optical fiber is passed through each hole of a front plate, a back plate, and a third plate, and the back plate is offset (translated), so that the optical fiber is clamped by the inner walls of the holes, and is then adhered and fixed.

As for other structure of the two-dimensional optical fiber array, it is known that one substrate is used for holding the optical fiber of a fiber (for example, JP-A-2004-271656 (FIGS. 1-3, pp. 6-8)). In JP-A-2004-271656 (FIGS. 1-3, pp. 6-8), the optical core of an coated optical fiber is inserted into a through-hole of an optical fiber array substrate and is fixed.

SUMMARY OF THE INVENTION

However, the optical fiber array using a substrate in which through-holes are formed has the following problems. Before the tip of an coated optical fiber is inserted, a resin protective coating thereof is removed to expose the optical fiber portion made of silica glass. Although this optical fiber portion is inserted into a through-hole, the depth of the through-hole is shallow as compared with the length of the exposed optical fiber portion and thus the entire optical fiber portion may neither be housed nor be fixed. Accordingly, a part of the above-described optical fiber portion will come out of the through-hole and be exposed.

The exposed optical fiber portion is weak in strength due to a lack of the protective coating, and sometimes is bent or broken in handling the opposite side of a tip to be inserted of the coated optical fiber. Moreover, the bending causes a bending loss or bends the emitted light from the coated optical fiber to increase the interconnection loss when connecting with a filter element, and the like, thus causing a problem that the optical properties degrade.

In order to solve this problem, although a method of deepening the through-hole may be considered, it is not preferable in terms of manufacturing the substrate. Namely, in the case where a liquid phase etching or a gas phase etching in photolithography techniques is employed to form the through-hole, if the etched depth becomes deep, even if attempting to form a vertical through-hole, the inner-wall face of the hole is inclined from the direction perpendicular to the substrate face and becomes taper-shaped to increase the clearance between the coated optical fiber to be inserted, resulting in a problem of inclining the coated optical fiber. Moreover, inconveniently, the etching time will increase and the manufacturing man-hour will increase. Moreover, although the manufacture cost will be reduced if machining by a drill, or the like, is employed to form the through-hole, there is a problem in the positional accuracy since the bore diameter varies due to the wearing or misalignment of the drill, or the pitch between the holes varies due to a problem in the feeding accuracy of the stage. Accordingly, neither one of the above is a decisive solution.

In U.S. Pat. No. 6,690,875 (FIG. 4, columns 6-7), for the purpose of suppressing the angle variations the optical fiber is pressed against the inner-wall face of a hole of the primary substrate. However, this presents a problem that because the coating portion is bent by means of the angle alignment substrate, the position of the optical fiber of a coated optical fiber varies due to the elastic deformation or heat deformation of the coating, resulting in optical fibers that are inclined against the inner-wall face of the primary substrate. Moreover, the bending applies a load to the coating and the optical fiber, which is not preferable in terms of the strength. An optically larger bending loss will occur because the bending is not carried out in a large curvature but the optical fiber is bent. The primary substrate and other substrate are offset from each other without sharing the axis line of a hole with respect to an coated optical fiber, and thus this does not arrange the coated optical fibers in a straight line to fix. This method also has a problem that because this is a method for fixing the optical fiber using only one primary substrate, a optical fiber that is likely to be bent during assembly deviates from the hole and hits the primary substrate, so that the optical fiber is broken.

U.S. Pat. No. 5,135,590 (FIG. 1, columns 3-5) has a problem that when attempting to insert the optical fiber of an coated optical fiber into two substrates having a hole with a small diameter, the optical fiber that is likely to be bent deviates from the hole and hits the primary substrate, so that the optical fiber is broken. A metal member that supports two substrates has a hole and houses one or several optical fibers. However, this also presents a problem that the gap between the hole and the optical fiber and the gap between the optical fibers increase, and the above-described hole does not serve as a support or a guide, so that the optical fiber will be bent and broken.

In U.S. Pat. No. 6,633,719 (FIG. 6, FIG. 7, from line 55 in column 5 to line 19 of column 6), a load is applied to the optical fiber of an coated optical fiber when offsetting the back plate, which is not preferable in terms of the strength and optical loss. Because an array of coated optical fibers is collectively positioned by an offset, the positioning accuracy of the optical fiber is limited by the positioning accuracy of a pin and therefore this has a problem that the position of each of the coated optical fibers may not be aligned with high accuracy.

JP-A-2004-271656 (FIGS. 1-3, pp. 6-8) has a problem that when attempting to insert the optical fiber of an coated optical fiber into a substrate having through-holes with a small diameter, the optical fiber that is likely to be bent during assembly deviates from the hole and hits the primary substrate, so that the optical fiber is broken. A glass layer has holes formed therein and house all optical fibers. However, this also has a problem that the gap between the hole and the optical fiber becomes large and the hole will not serve as a support or a guide, so that the optical fiber is bent and broken.

The present invention has been made focusing attention on such problems, and is intended to provide optical fiber arrays having a structure to prevent the breaking or bending of coated optical fibers and also having a high positional accuracy, and the present invention is also intended to provide optical components and optical switches using the optical fiber array.

An optical fiber array of the present invention includes: a plurality of coated optical fibers; and a first substrate, second substrate, and third substrate that have a plurality of through-holes for inserting the coated optical fibers; wherein the substrates have the through-holes opposingly arranged and are arranged in the order of the first substrate, the second substrate, and the third substrate, wherein the coated optical fibers are inserted into the through-holes of the opposingly arranged first substrate, second substrate, and third substrate while a coating of a tip thereof is removed so as to expose a optical fiber, and the through-holes of the first and second substrates supports the coated optical fibers at the optical fiber portion thereof, and the through-hole of the third substrate supports the coated optical fibers at a coating portion thereof. The structure allows the optical fiber of the coated optical fiber to be supported at two places of the through-hole of the first substrate and through-hole of the second substrate, thereby preventing the coated optical fiber from been bent. Accordingly, the likelihood to be bent and broken may be suppressed to secure reliability. Furthermore, by supporting the coating of the optical fiber by means of the through-hole of the third substrate, the optical fiber portion that is exposed from the through-hole of the second substrate toward the through-hole of the third substrate may be prevented from being bent. Accordingly, the likelihood that the exposing optical fiber is broken may be suppressed to obtain high reliability. According to the structure, because the depth of the through-hole may be made shallow as compared with a case where the support from the optical fiber to the coating is carried out by means of one block, an optical fiber array with high positional accuracy may be achieved. In addition, the process concerning the manufacture of the through-holes may be simplified because the through-holes may be made shallow.

Although the number of the substrates is preferably three from the viewpoints of the function, cost, workability, and the like, of the fiber support, it is also possible to increase the number of places to support by increasing the number of substrates for supporting the optical fiber portion, or by increasing the number of substrates for supporting the coating portion. Moreover, a substrate, in which other optical elements, such as a collimating lens, a mirror, and a photo detector are mounted, may be combined with the substrate concerning the optical fiber array of the present invention.

The through-hole may be of a cylindrical shape whose pore shape will not vary in the thickness direction of the substrate, or the pore shape may vary in the thickness direction of the substrate like in the case where the entire through-hole has a taper, or the like. However, the through-hole is preferably of a cylindrical shape from the viewpoints of positioning accuracy of coated optical fibers and of achieving a higher density of array.

In the optical fiber array, the thickness of the first substrate and second substrate is preferably ten times or less the diameter of the optical fiber of the coated optical fiber to be inserted. Even if the thickness of the substrate is set to over ten times the diameter of the optical fiber of the coated optical fiber to be inserted, there is no functional advantage in supporting the coated optical fibers, and an additional manufacturing man-hour is needed, which is inefficient. Too deep through-hole makes it difficult to maintain high positioning accuracy.

Furthermore, the thickness of the first substrate and second substrate is preferably two times or more the diameter of the optical fiber of the coated optical fiber to be inserted. Two times or more the thickness of the substrate would be sufficient for the function to support the coated optical fiber. If the thickness of the substrate is set to less than two times, the through-hole becomes shallow and the inserted coated optical fiber is likely to be inclined, thereby making it difficult to secure the positional accuracy. Moreover, a thin substrate is likely to be damaged, and thus the end face may collide with the substrate to chip off an edge of the through-hole when inserting the optical fiber of an coated optical fiber into the through-hole. In this case, the clearance between the through-hole and the optical fiber expands, so that the positional accuracy may not be secured.

Furthermore, the thickness of the third substrate is preferably larger than and ten times or less the diameter of the coating of the coated optical fiber to be inserted. The thickness of the substrate larger than the diameter of the coating would be sufficient for the function to support the coated optical fiber. If the thickness of the substrate is set to be equal to the diameter of the coating, the through-hole becomes shallow and the inserted coated optical fiber is likely to be inclined, thereby making it difficult to secure the positional accuracy, or disabling to obtain a sufficient fixing strength. Moreover, a thin substrate is likely to be damaged, and thus the end face may collide with the substrate to chip off an edge of the through-hole when inserting the optical fiber of an coated optical fiber into the through-hole. In this case, the clearance between the through-hole and the optical fiber expands, so that the positional accuracy may not be secured.

On the contrary, even if the thickness of the substrate is set to over ten times the diameter of the coating of the coated optical fiber, there is no functional advantage in supporting the coating of the coated optical fiber, and an additional manufacturing man-hour is needed, which is inefficient.

Moreover, in the optical fiber array, the through-hole which the first substrate and second substrate have may comprises: a parallel pore; and a taper portion connected to an end of the parallel pore and extended toward the substrate surface, and the depth of the parallel pore may be in the range from two times to ten times of the diameter of the optical fiber of the coated optical fiber. The taper portion serves as a guide for inserting the coated optical fiber and allows for simple insertion, thereby improving the working efficiency. On the other hand, the parallel pore contributes to securing the positioning accuracy of the coated optical fiber. In addition, in this case, the depth of the parallel pore is desirably in the range from two times to ten times of the diameter of the optical fiber of the coated optical fiber for the reason.

Moreover, the through-hole which the third substrate has may comprise: a parallel pore; and a taper portion connected to an end of the parallel pore and extended toward the substrate surface, and the depth of the parallel pore may be larger than and ten times or less the diameter of the coating of the coated optical fiber. The taper portion serves as a guide for inserting the coated optical fiber and allows for simple insertion, thereby improving the working efficiency. On the other hand, the parallel pore contributes to securing the positioning accuracy of the coating of the coated optical fiber. In addition, in this case the depth of the parallel pore is desirably larger than and ten times or less the diameter of the optical fiber of the coated optical fiber for the above-described reason.

Furthermore, the diameter of the through-hole which the first substrate has, or the diameter of the parallel pore of the through-hole is preferably larger than the diameter of the optical fiber of the coated optical fiber by 0.1 to 30 μm. If larger than this, the gap between the coated optical fiber and the inner-wall face of the through-hole becomes large, making it difficult to secure the positional accuracy at the tip of the coated optical fiber. Moreover, with less than 0.1 μm, the gap is too small and the insertion work of the coated optical fiber becomes difficult. Here, the diameter of the parallel pore of the through-hole refers, when the hole shape of the parallel pore is circular, to the diameter thereof, and, when it is elliptical or polygonal, to the diameter of the inscribed circle thereof. Moreover, the diameter of the through-hole in the case where the through-hole is not divided into a parallel pore and a taper portion refers, when the hole shape is circular, to the diameter thereof, and, when it is elliptical or polygonal, to the diameter of the inscribed circle thereof, and at the same time refers to the smallest one within the through-hole (hereinafter, the definition of the diameter concerning the through-hole is the same).

The diameter of the through-hole which the first substrate has, or the diameter of the parallel pore of the through-hole which the first substrate has is more preferably larger than the diameter of the optical fiber of the coated optical fiber by 0.1 to 5 μm. The positional accuracy at the tip of the coated optical fiber may be improved further because the clearance between the optical fiber of the coated optical fiber and the inner-wall face of the through-hole becomes small.

Furthermore, the diameter of the through-hole which the second substrate has, or the diameter of the parallel pore of the through-hole which the second substrate has is preferably larger than the diameter of the optical fiber of the coated optical fiber by 0.1 to 30 μm. If the diameter of the through-hole or the diameter of the parallel pore of the through-hole is larger than the diameter of the optical fiber of the coated optical fiber by more than 30 μm, the coated optical fiber will be inclined, thereby making it difficult to insert the coated optical fiber into the through-hole of the first substrate. Moreover, with less than 0.1 μm, the gap is too small and the insertion work of the coated optical fiber becomes difficult. However, the coated optical fiber just needs to be kept approximately in parallel because the through-hole of the second substrate holds an intermediate portion of the optical fiber of the coated optical fiber. Therefore, with respect to the through-hole of the second substrate, the restriction to the positioning is relaxed as compared with the through-hole of the first substrate, and the through-hole of the second substrate is preferably larger than the through-hole of the first substrate from the viewpoint of workability.

Furthermore, it is preferable that the diameter of the through-hole which the third substrate has or the diameter of the parallel pore of the through-hole which the third substance has is larger than the diameter of the coating of the above-described coated optical fiber by 10 μm or more, and is smaller than two times the diameter of the coating. The coating is typically made of resin and the tolerance of the diameter is large as compared with that of the optical fiber made of glass. Because the coating may elastically deform or thermally deform, if the gap between the coating, and the through-hole or the parallel pore of the through-hole is small, then the insertion work will be difficult. The diameter of the through-hole which the third substrate has, or the diameter of the parallel pore of the through-hole which the third substance has is adequately larger than the diameter of the coating of the coated optical fiber by 10 μm or more. Moreover, because the through-hole of the third substrate holds an intermediate portion of the optical fiber coating, the coated optical fiber just needs to be kept approximately in parallel to the extent that neither a bending loss nor breaking occurs. Accordingly, with respect to the through-hole of the third substrate, the restriction to the positioning is relaxed as compared with the through-hole of the first and second substrates, and the through-hole of the third substrate is preferably larger than the through-hole of the second substrate from the viewpoint of workability. Moreover, if the through-hole of the third substrate becomes larger than two times the diameter of the coating, a problem may occur that the coatings of two or more coated optical fibers are inserted into one through-hole by mistake. Being less than two times may prevent this problem.

At least one through-hole among the through-holes of the third substrate may be a slit shaped through-hole, the slit shaped through-hole may be formed so that a plurality of through-holes provided in the second substrate may be opposingly arranged, and each coated optical fiber inserted into a plurality of through-holes of the second substrate may be inserted into the slit shaped through-hole. In order to support the protective coating, the through-hole of the third substrate becomes large as compared with the first and second through-holes that support only optical fiber, and the pitch between the through-holes also needs to be increased accordingly. Although the pitch between the through-holes needs to be reduced when attempting to arrange the coated optical fibers in higher density, it is limited by the pitch between the through-holes of the third substrate, and there is a limit in achieving high density. In the structure, the protective coatings of a plurality of coated optical fibers are supported by means of one slit shaped through-hole to prevent this limitation, and thus the arrangement pitch of the coated optical fibers may be configured with an interval as large as the diameter of the coated optical fiber including the coating, so that a higher density may be achieved without damaging reliability. The slit shaped through-hole is a through-hole having a long hole shape whose bore diameter is long in one direction, i.e., a slit shape. From the viewpoint of keeping the positional accuracy high, the length in the direction perpendicular to the longitudinal direction, i.e., in the width direction of the slit, is preferably constant in the longitudinal direction. The shape of the cross section of the slit shaped through-hole may be of a circle or ellipse extended in one direction, or a rectangular, or the like. Regardless of these shapes, the length in the longitudinal direction in the cross section is the major axis, and the length in the width direction (the width at the narrowest portion) is the minor axis. If the slit shaped through-hole is divided into a parallel pore and a taper portion, the cross-section of the parallel pore is to be observed.

Furthermore, a plurality of slit shaped through-holes which the third substrate has are preferably formed spaced apart to each other on the third substrate. In the case where the space between the coated optical fibers is wide, if attempting to house the coating of all the coated optical fibers by means of a single slit shaped through-hole, then a large deviation occurs in the gap between the coated optical fibers, causing an inconvenience that the coated optical fiber is bent. In the case where the pitch between the coated optical fibers is wide (or in the wide direction), it is desirable that a plurality of spaced apart through-holes are installed to fix the coated optical fibers to each through-hole. Employing a plurality of slit shaped through-holes not only allows for the arrangement of the coated optical fibers at a narrow pitch, but may address even the case where a narrow pitch and a wide pitch are intermingled, and may improve the degree of freedom of arrangement, which is preferable.

Furthermore, it is preferable that the minor axis of the slit shaped through-hole which the third substrate has is smaller than two times the diameter of the coating, and is larger than the diameter of the coating by 10 µm or more. Because the minor axis is smaller than two times, the coated optical fibers are arranged in one line within one slit shaped through-hole. Moreover, it is possible to prevent that the coated optical fibers are misplaced to each other within the through-hole during the insertion work, so that the order thereof is interchanged. Moreover, for the above-described reason, the minor axis of the slit shaped through-hole is desirably larger than the diameter of the coating by 10 µm or more.

Furthermore, the gap produced between a plurality of coated optical fibers inserted into the slit shaped through-hole is preferably two times or less the diameter of the coating. When the coated optical fibers are inserted into the slit shaped through-hole having a long major axis, the gap may become two times or more. In this case, if deviatingly fixed, the coating will be inconveniently bent. In order to prevent this inconvenience, the gap produced between the plurality of coated optical fibers inserted into the slit shaped through-hole is preferably suppressed to two times or less the diameter of the coating. If a gap with two times or more occurs, not the slit shaped through-hole but a plurality of spaced-apart through-holes each of which houses the coating of one coated optical fiber are more preferable.

Furthermore, in the optical fiber array, the space between the first substrate and second substrate is preferably in the range from 1 mm to 10 mm. By providing a space with the range from 1 mm to 10 mm in between the substrates, the optical fibers of the coated optical fibers that are held by means of two spaced apart through-holes will be kept in parallel to each other with sufficient accuracy. If the distance between the through-holes is smaller than 1 mm, the angle at which the coated optical fiber is inclined will increase, thereby reducing the degree of parallelization. The degree of parallelization will improve if the space between the first substrate and the second substrate is increased, however, even if the space is set to over 10 mm the degree of parallelization will change little, inviting a high cost due to an increase in the material cost or an increase in the occupied volume, and therefore 10 mm or less is preferable.

In order to provide a space between the first substrate and the second substrate, a structure is preferable in which a spacer of a predetermined thickness is interposed between the substrates. The use of a spacer, which is easily manufactured with high accuracy by machining, may provide a high precision space in between the first substrate and the second substrate.

In addition, the gap between the first substrate and the second substrate may be fixed by pouring UV curable resin, or the like, after inserting and fixing the coated optical fiber. The optical fiber of the coated optical fiber may be enclosed with the resin and be fixed more firmly. In a similar manner, a gap may be provided between the second substrate and the third substrate, and then UV curable resin or the like may be poured therein to fix the optical fiber and coating of the coated optical fiber.

Furthermore, it is desirable that in addition to the plurality of through-holes, a positioning hole is oppositely arranged in the first to third substrates so that a positioning pin may be inserted. If the positioning hole is provided in addition to the plurality of through-holes formed in the first to third substrates in advance, the positioning of the first to third substrates may be easily achieved by inserting the positioning pin in this positioning hole. Accordingly, the center axis of the coated optical fiber may be easily aligned. In addition, the positioning pin may be removed after fixing the substrate to the spacer by adhesive or the like. Moreover, the substrates each may be fixed and spaced apart onto a metal plate or the like via an L-shaped angle. Moreover, a frame that surrounds the contour of the substrate may be prepared, and the edge of the substrate and the frame may be fixed by adhesive to space apart the substrates.

Furthermore, it is preferable that the quality of the material of at least the first substrate is silicon and a silicon oxide film is formed in the surface thereof. A silicon substrate is inexpensive and easily available, and by combining photolithography with various etching techniques, a process with an accuracy of submicron or less may be collectively applied thereto, and this is the most suitable one as a method of manufacturing the through-holes of the substrate of the present invention. Especially the through-hole of the first substrate determines the pitch of the coated optical fibers, so the precision prescribed thereof is severe and thus this method is desirably employed. Because the surface of silicon has a high water repellency and repels adhesive when it is dripped thereto, it is difficult to keep the adhesive only at a desired place. Although in fixing the coated optical fiber and the substrate by adhesive, the adhesive is dripped in the vicinity of the through-hole into which the coated optical fiber is inserted, a problem occurs that a part of the adhesive moves also to the adjacent through-hole and buries the through-hole (hereinafter, dripping means applying adhesive to a place desired to be adhered). A silicon oxide film has a low water repellency and is unlikely to cause such problem, which is therefore more suitable. The silicon oxide film may exist across the surface of the substrate or may exist only in the wall face of a through-hole. In the latter case, the adhesive is likely to stay in the vicinity of the through-hole. In addition, here, dripping corresponds to applying adhesive to a place desired to be adhered.

In addition, not only in the first substrate but also in the second substrate and third substrate, the quality of the material may be silicon, and silicon oxide film may be formed in the surface thereof. The through-hole may be formed with a small variation and high accuracy, and the degree of parallelization of the coated optical fiber may be improved. However, the accuracy prescribed of the through-hole of the second substrate and the third substrate is relaxed as compared with the first substrate, and if the cost effect is preferred, methods of manufacturing with a large variation but more inexpensive, e.g., etching or drilling of a metal substrate, may be employed.

It is preferable that with the use of a holding member, in which two opposing surfaces and a slit provided therebetweeen are provided, the first substrate and third substrate are provided in the opposing surfaces of the holding member, and the second substrate is fixed to the wall face of the slit. If the first substrate and the second substrate as well as the second substrate and the third substrate are spaced apart with a spacer, respectively, two or more spacers are required. With the holding member, the first substrate and the second substrate as well as the second substrate and the third substrate may be spaced out by means of one member, allowing the number of components to be reduced. Moreover, although in using two or more spacers the spacers and the substrate are fixed with a bolt or adhesive, the shape will be such that the spacers and the substrate are stacked alternatively and thus the rigidity is low and deformation is likely to occur. However, if the holding member is employed, the first to third substrates are fixed to one member, so that the rigidity is high and deformation is unlikely to occur. In addition, the slit as the holding member may be in either shape of a hole-shape, a groove-shape, and a notch shape, as long as it has a surface capable of fixing the second substrate so as to be in parallel to the first and third substrates.

Moreover, in the optical fiber array, it is preferable that the end face of the optical fiber of the coated optical fiber is slantly polished. Because the end face of the coated optical fiber is slantly polished, it is possible to reduce the reflective return light generated when light is emitted from the end face. Less reflective return light is more desirable because the reflective return light makes the operation of a laser device unstable. Although the polishing process may be carried out either way, before inserting the coated optical fiber or after inserting the same, the polishing process is better to be carried out after the insertion because a collective processing may be carried out and the slanting face becomes in the same direction.

Moreover, in the optical fiber array, the end face of the optical fiber of the coated optical fiber is desirably provided with an antireflection film. With the antireflection film, it is possible to reduce the reflective return light generated when light is emitted from the end face of the coated optical fiber. Moreover, as the kind of the antireflection film, a single layer film whose film structure is of a single refractive index or a multilayer film in which layers with a plurality of refractive indexes are systematically laminated may be selected adequately.

Moreover, the optical component of the present invention is an optical component using a plurality of coated optical fibers, wherein as the plurality of coated optical fibers, the optical fiber array is used. The optical component is especially suitable in constituting optical array type components. Here, an "array type" is a term corresponding to a stand alone optical component causing the light that transmits through one coated optical fiber to carry out functions, such as multiplexing, demultiplexing, switching, amplification, attenuation, or the like, and refers to structures causing each light that transmits though a plurality of coated optical fibers to carry out functions, such as multiplexing, demultiplexing, switching, amplification, attenuation, or the like. The optical fiber array of the present invention suppresses bending or breaking of coated optical fibers, and also has high positional accuracy, thereby allowing the reliability as an optical component to be improved. Moreover, miniaturization as the optical component may be achieved because the coated optical fibers may be arranged in high density.

Moreover, the optical switch of the present invention is an optical switch using a plurality of coated optical fibers, the optical switch being for switching optical paths between the coated optical fibers, wherein the optical fiber array is used as the plurality of coated optical fibers. The optical switch of the present invention is suitable especially in constituting optical array type components. The optical fiber array of the present invention suppresses bending or breaking of the coated optical fibers, so that the reliability as the optical component may be improved. Moreover, miniaturization as the optical component may be achieved because coated optical fibers may be arranged in high density, and the occupied volume may be reduce as compared with the case where a stand alone optical switch is aligned in parallel. Moreover, the optical switch of the present invention is advantageous in achieving a low-loss optical switch that suppresses the coupling loss due to a positional deviation, because the positional accuracy of each coated optical fiber is high.

According to the present invention, it is possible to provide optical fiber arrays that prevent bending or breaking of coated optical fibers, the optical fiber arrays with high positional accuracy, and is also possible to provide optical components and optical switches using the optical fiber array.

Other objects, features and advantages of the invention will become apparent from the following description of the embodiments of the invention taken in conjunction with the accompanying drawings.

BRIEF DESCRIPTION OF THE DRAWINGS

FIG. 7 is a schematic view of a cross section of an optical fiber array of another embodiment of the present invention.

FIGS. 8A-8D are schematic front views of the substrates of optical fiber arrays of embodiments of the present invention, and of a reference example.

FIGS. 9A-9C are schematic views of the cross section of the substrates of optical fiber arrays of embodiments of the present invention, and of a reference example.

DESCRIPTION OF EMBODIMENTS

Figure 1:
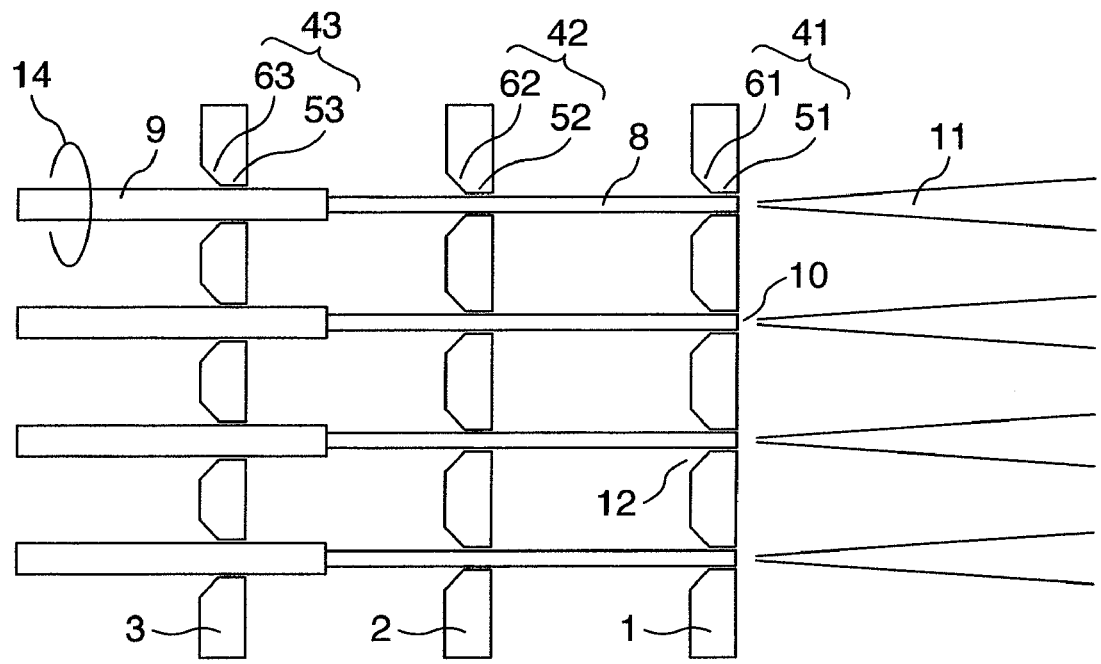
FIG. 1 is a schematic view of a cross section of an optical fiber array of an embodiment of the present invention.

Hereinafter, the present invention will be further described using specific embodiments. However, the present invention is not limited to these embodiments. In addition, similar components will be described using the same reference numerals.

Embodiment 1

Figure 2:
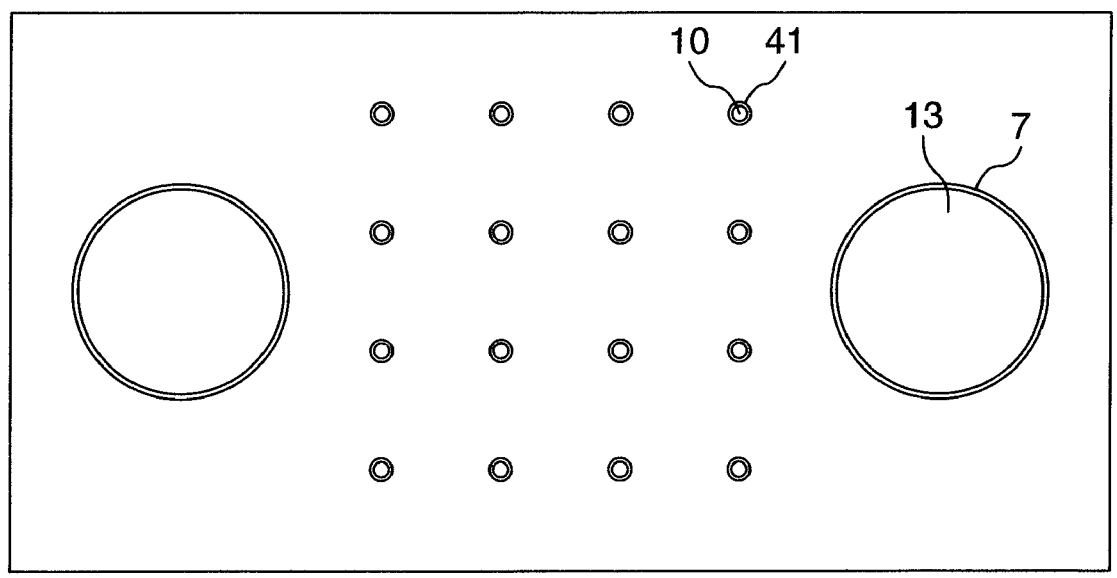
FIG. 2 is a schematic front view of the optical fiber array of FIG. 1.

FIG. 1 is a cross sectional view showing an example of an optical fiber array concerning an embodiment of the present invention and FIG. 2 is the front view. In the optical fiber array shown in FIG. 1, a plurality of coated optical fibers 14; and a first substrate 1, second substrate 2, and third substrate 3 that have a plurality of through-holes 41, 42 and 43 for inserting the coated optical fibers; wherein the substrates have the through-holes opposingly arranged and are arranged in the order of the first substrate, the second substrate, and the third substrate. The each substrate serve as an alignment substrate for aligning the coated optical fibers 14. As shown in FIG. 1, the coated optical fiber 14 is inserted into the through-holes of the opposingly arranged first substrate, second substrate, and third substrate while a protective coating 9 at a tip thereof is removed so as to expose a optical fiber, wherein the through-holes 41 and 42 of the first and second substrates support the coated optical fiber 14 at the optical fiber 8 portion, and the through-hole 43 of the third substrate supports the coated optical fiber 14 at the protective coating 9 portion. Although the first substrate 1, the second substrate 2, and the third substrate 3 are arranged spaced apart, the substrates are held in parallel to each other and the through-holes formed in each substrate are opposingly arranged so that the coated optical fiber 14 may be inserted, thereby allowing for linear insertion of the coated optical fiber 14 as shown in FIG. 1.

As shown in FIG. 2, the coated optical fiber 14 is inserted into each of a plurality of through-holes 41 formed in the first substrate 1, and the tip of the coated optical fiber is visible. In addition to the plurality of through-holes, a positioning hole 7 is opposingly arranged in the first to third substrates so that a positioning pin 13 may be inserted. In FIG. 2, the positioning pin 13 is inserted into the positioning hole 7 to position and fix the first substrate 1, the second substrate 2, and the third substrate 3.

Figure 3:
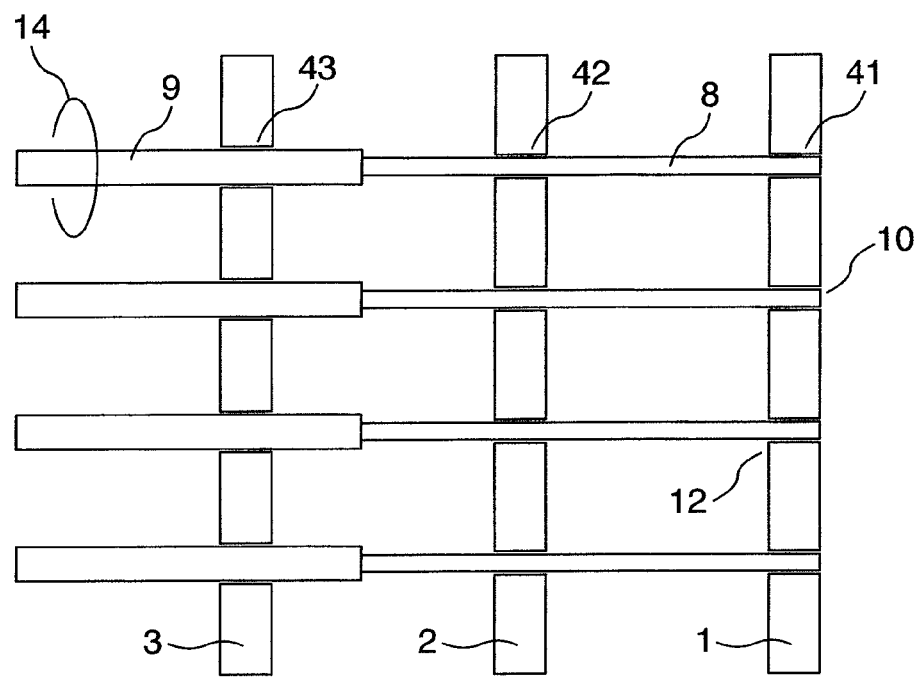
FIG. 3 is a schematic view of a cross section of an optical fiber array of another embodiment of the present invention.

In Embodiment 1, as shown in FIG. 1, the description is made using a structure in which the through-holes 41, 42, and 43 have parallel pores 51, 52, and 53, and taper portions 61, 62, and 63 that are connected to an end of the parallel pore and are extended toward the substrate surface, however, as shown in FIG. 3, a structure that does not have the taper portion may be employed. The structure of FIG. 1 having the taper portion is excellent in that the coated optical fiber is easily inserted, while the structure of FIG. 3 that does not have the taper portion is advantageous in achieving a higher density of the optical fiber array because the through-hole is constituted of the parallel pore.

The quality of the material of the substrate may be selected suitably from a silicon substrate, a glass substrate, a ceramics substrate, a resin substrate, and the like. In this embodiment, a silicon substrate to which photolithography may be applied easily is employed.

The through-hole 41 formed in the first substrate 1 is constituted of a parallel pore 51 and a taper portion 61 that is extended toward the substrate surface at an end of the parallel pore 51. The taper portion just needs to be formed at least on the inserting-side of the coated optical fiber 14, and in FIG. 1 the direction going from the third substrate 3 to the first substrate 1 is the insertion direction of the coated optical fiber 14, and the cross section, i.e., hole shape, of the parallel pore 51 formed on the inserting-side of the coated optical fiber 14 is circular and its diameter is 126 µm. The taper portion 61 is of a pyramid shape, which becomes larger toward an opening 12 of the substrate surface. The bottom of the taper portion 61 is a square of side length 126 µm, and the opening 12 is a square of side length 440 µm. With the taper portion 61, the coated optical fiber tip 10 is introduced and inserted into the parallel pore 51.

The method of manufacturing the substrate is described. A silicon substrate (Si) with the thickness of 0.525 mm and plane direction (100) is heat-treated to form a silicon oxide film ($SiO_2$) in the surface. By carrying out the techniques of photolithography, i.e., resist application, mask exposure, development, and oxide film etching, a plurality of patterns of 440 µm square used for the opening 12 of the taper portion 61 are formed in a single-sided silicon oxide film. The pattern pitch is 1 mm vertically and 1 mm horizontally, and a total of 16 pieces, four pieces vertically and four pieces horizontally, are formed in a grid shape. At the same time, a square pattern is also formed used for the positioning hole 7. Because the thickness of the substrate is 0.525 mm, if a substrate with the configuration of FIG. 1 is constituted using the one with 125 µm (to be described later) as a optical fiber 8 of the coated optical fiber to be inserted, the thickness of the both first substrate and second substrate will be 4.2 times the diameter of the optical fiber of the coated optical fiber to be inserted.

Crystal anisotropy etching is carried out by immersing the substrate, in which the pattern is formed, into 40% by weight of potassium hydroxide solution. This forms the pyramid-shaped taper portion 61 having the opening 12 of 440 µm square. The bottom of the hole is 126 µm square.

In a face opposite to the face, in which the taper portion 61 is formed, an aluminum film (Al) is formed by a sputtering method, and a circular pattern of 126 µm is formed on the aluminum film by photolithography. The pitch of the pattern is equal to that of the taper portion 61 in the opposite face, and the center of the circle agrees with the center of the taper portion 61.

Etching is carried out with a reactive ion etching equipment to form the parallel pore 51 whose cross section is of a circle. Because in reactive ion etching, a step of etching silicon and a step of protecting the wall face of the hole are repeated, the respective conditions need to be established adequately in order to form the parallel pore 51. In the etching step, by controlling the quantity of gas flow of sulfur hexafluoride ($SF_6$) that is an etching gas and the time for introducing the same, the antenna output for generating plasma, the bias output applied to between the electrode substrates, and the substrate temperature, while in the step for protecting the wall face of the hole, by controlling the quantity of gas flow of octafluorocyclobutane ($C_4F_8$) that is a protective film forming-gas and the time for introducing the same, the antenna output for generating plasma, the bias output applied to between the electrode substrates, and the substrate temperature, the etching is carried out to pass through the bottom face of the taper 61, thereby forming the parallel pore 51. The depth of the parallel pore 51, i.e., the length in the direction perpendicular to the substrate, is 300 μm. In addition, because the positional accuracy on the coated optical fiber tip 11 side of the parallel pore is important, the substrate was manufactured under the same conditions as the above except that the etching is carried out from the opposite side of the taper portion, and then the pitch between the holes could be formed with higher accuracy.

At the same time, the parallel pore of the positioning hole 7 was also formed. After dry etching, the aluminum film was immersed and removed in a hydrofluoric acid solution, and again heat treatment was carried out to form a silicon oxide film in the surface. Through the above steps, the first substrate is completed.

The second substrate 2 and the third substrate 3 are manufactured using the same method. In the second substrate 2, the diameter of the parallel pore 52 is changed to 140 μm, and in the third substrate 3 the diameter of the parallel pore 53 to 270 μm, and the opening 12 of the taper hole 63 to 700 μm. That is, the diameter of the through-hole of the second substrate is larger than the diameter of the through-hole of the first substrate, and the diameter of the through-hole of the third substrate is large rather than the diameter of the through-hole of the second substrate. Furthermore, the clearance in the through-hole of the second substrate is larger than the clearance in the through-hole of the first substrate, and the clearance in the through-hole of the third substrate is large than the clearance in the through-hole of the second substrate. This improved the workability and reduced damages, and the like. On the other hand, the position and interval of the through-holes and positioning holes used for fixing the coated optical fibers are equal to those of the first substrate 1. Accordingly, the through-hole 42 of the second substrate and the through-hole 43 of the third substrate corresponding to the through-hole 41 of the first substrate are on the same center axis. Thus, the coated optical fibers 14 to be inserted may keep parallelism to each other.

Next, the assembly of the optical fiber array is described. The positioning pin 13 is inserted into the positioning hole 7 of the first to third substrates and is fixed. Between the substrates each, a spacer of 4 mm thickness is interposed to space apart. That is, the space between the first substrate and the second substrate and the space between the second substrate and the third substrate are set to 4 mm. The illustration of the spacer is omitted. The degree of parallelization between the coated optical fibers depend on the clearance of the through-holes of the first substrate and second substrate, and on the distance between the through-holes. If the clearance of the through-hole is large, the movable range of the coated optical fiber will increase to thereby decrease the degree of parallelization. Moreover, if the distance between the through-holes is small, the angle that the optical fiber inclines will increase to thereby decrease the degree of parallelization. In the case where the through-hole of the first substrate is a hole larger than the coated optical fiber by 5 μm, and the through-hole of the second substrate is a hole larger than the coated optical fiber by 30 μm, the distance between through-holes, i.e., the distance between the first substrate and the second substrate, has to be 1 mm or more in order for the degree of parallelization to be within 1°. Accordingly, assuming that the diameter of the through-hole which the first substrate has or the diameter of the parallel pore of the through-hole is larger than the diameter of the optical fiber of the coated optical fiber by 0.1 to 5 μm, and that the diameter of the through-hole which the second substrate has or the diameter of the parallel pore of the through-hole is larger than the diameter of the optical fiber of the coated optical fiber by 0.1 to 30 μm, then the distance between the first substrate and the second substrate is preferably 1 mm or more in order for the degree of parallelization to be within 1°.

Subsequently, the coated optical fiber 14 to be inserted is prepared. The protective coating 9 at the tip of the coated optical fiber is removed to expose the optical fiber 8. The smooth end face 10 is obtained using a dedicated cutter. The diameter of the optical fiber 8 of the coated optical fiber 14 is set to 250 μm, the diameter of the protective coating 9 is set to 125 μm, and the length of the optical fiber 8 to be exposed is set to 7 mm.

The prepared coated optical fiber 14 is inserted into and passed through the through-hole 43 of the third substrate 3, the through-hole 42 of the second substrate 2, and the through-hole 41 of the first substrate 1 in this order. The taper portions 63, 62, and 61 lead the coated optical fiber tip 10 to the parallel pores 53, 52, and 51, thereby facilitating the insertion.

After determining the position of the coated optical fiber tip 10, each of the through-holes 43, 42, and 41, the optical fiber 8 of the coated optical fiber, and the protective coating 9 are fixed by adhesive. Illustration of the adhesive is omitted.

This work is repeated to insert and fix 16 coated optical fibers, thus completing the optical fiber array.

As opposed to the diameter of 125 μm of the optical fiber 8 of the coated optical fiber 14, the diameters of the parallel pore 51 of the through-hole 41 of the first substrate 1 is 126 μm, the diameter of the parallel pore 51 of the through-hole 41 which the first substrate has is larger than the diameter of the optical fiber 8 of the coated optical fiber 14 by 1 μm, and there is thus the gap of 1 μm as a total between the parallel pore 51 and the optical fiber 8. That is, the coated optical fiber tip 10 could be arranged at the vertical and horizontal pitch of 1 mm±0.5 μm.

Moreover, as opposed to the diameter of 125 μm of the optical fiber 8 of the coated optical fiber 14, the diameters of the parallel pore 52 of the through-hole 42 of the second substrate 2 is 130 μm, the diameter of the parallel pore 52 of the through-hole 42 which the second substrate has is larger than the diameter of the optical fiber 8 of the coated optical fiber 14 by 5 μm, and there is thus the gap of 5 μm as a total between the parallel pore 52 and the optical fiber 8.

Moreover, as opposed to the diameter of 250 μm of the protective coating 9 of the coated optical fiber 14, the diameters of the parallel pore 53 of the through-hole 43 of the third substrate 3 is 270 μm, the diameter of the parallel pore 53 of the through-hole 43 which the third substrate has is larger than the diameter of the optical fiber 8 of the coated optical fiber 14 by 20 μm, and there is thus the gap of 20 μm as a total between the parallel pore 53 and the optical fiber 8.

As opposed to the diameter of 125 μm of the optical fiber 8 of the coated optical fiber 14, the depth of the parallel pore 51, i.e., the length in the direction perpendicular to the substrate, is 300 μm, which is 2.4 times. The edge of the through-hole did not chip off during insertion of the coated optical fibers.

The optical fiber 8 of the coated optical fiber 14 is fixed by the through-hole 41 of the first substrate 1 and the through-hole 42 of the second substrate, and is held approximately in parallel. Accordingly, emitted light 11 from the end face 10 of each coated optical fiber is a parallel light with mutually ±1° or less. That is, an optical fiber array excellent in the degree of parallelization of the optical axis is obtained. Accordingly, when optical components are constituted combining the optical fiber array of the present invention with a collimating lens, a mirror, a photo detector, or the like, high precision optical components may be achieved while preventing problems, such as breaking or bending.

The protective coating 9 of the coated optical fiber 14 is fixed by the through-hole 43 of the third substrate 3. Accordingly, even if the extra length of the coated optical fiber 14 is moved, the optical fiber 8 will be held without being bent, and thus breaking will not occur.

Moreover, an antireflection film is applied to this optical fiber array. At the coated optical fiber tip 10, a multilayer film of silicon oxide and tantalum oxide is formed by vacuum evaporation. Although the reflection loss was −14.7 dB before applying the antireflection film, this film forming process could reduce the reflective return light when light is emitted from the coated optical fiber tip 10, and suppress the reflection loss down to −30 dB.

Figure 4:
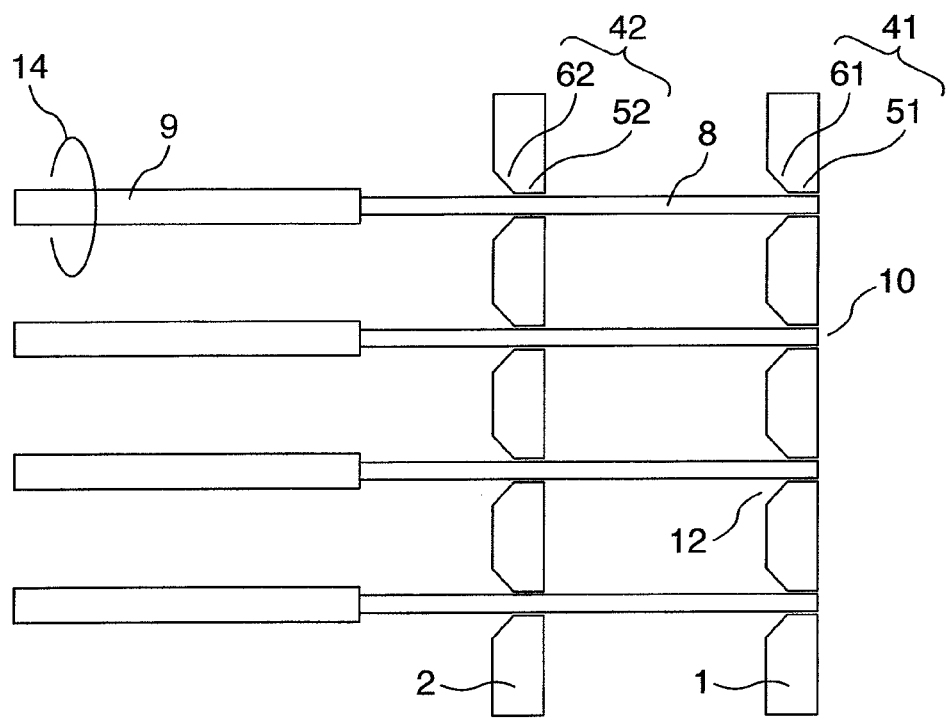
FIG. 4 is a schematic view of a cross section of an optical fiber array of a comparative example.
Figures 5, 6:
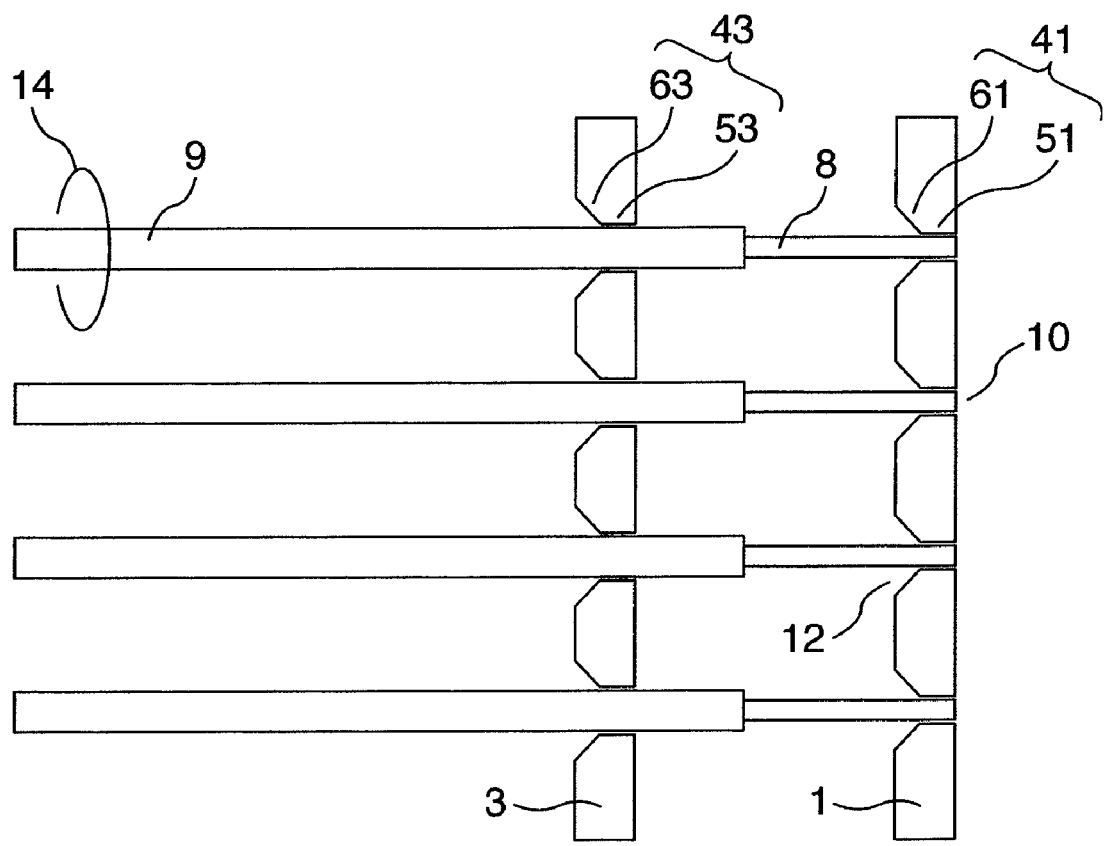
FIG. 5 is a schematic view of a cross section of an optical fiber array of another comparative example.
FIG. 6 is a table showing the characteristics of optical fiber arrays of the embodiment of the present invention, and of the comparative examples.

Furthermore, for comparison, an optical fiber array with a configuration that eliminated the third substrate (referred to as Comparative Example 1) and an optical fiber array with a configuration that eliminated the second substrate (referred to as Comparative Example 2) were manufactured. FIG. 4 shows a cross sectional view of an optical fiber array of Comparative Example 1, and FIG. 5 shows a cross sectional view of an optical fiber array of Comparative Example 2. In Comparative Example 2, the third substrate and the first substrate are spaced apart by 4 mm, and the length of the exposed optical fiber with the protective coating of the coated optical fiber being removed is set to 3 mm. Other than this, the number of the coated optical fibers 14 and the like are the same as those of the optical fiber array shown in FIG. 1.

In an optical fiber array of Comparative Example 1, although emitted light from the end face 10 of each coated optical fiber was a parallel light with mutually +/−1° or less, a breaking occurred at the boundary between the optical fiber and the protective coating when the extra length of the coated optical fiber 14 was moved during handling. The frequency of occurrence was 7 pieces out of 16 pieces. This might be because the optical fiber 8 was bent.

In an optical fiber array of Comparative Example 2, although there was no breaking during handling, the degree of parallelization of the emitted light from the end face 10 of each coated optical fiber decreased and was a parallel light with mutually +/−1.6° or less. This may explain that while the gap between the optical fiber 8 and the parallel pore of the second substrate is 5 μm, the gap between the protective coating 9 and the through-hole of the third substrate is as large as 20 μm and the movable range of the protective coating 9 is large, and thus the degree of parallelization decreased. Because the protective coating is formed of resin, the tolerance of the diameter is large as compared with the optical fiber, and thus the through-hole of the third substrate may not be made smaller any more. Moreover, the heat deformation or the bending tendency might cause this degradation in the degree of parallelization of the coated optical fiber 14. Although the optical fiber array of Comparative Example 2 may prevent the bending of the coated optical fiber 14, degrades the degree of parallelization of the emitted light, and produces an additional loss when combined with a collimating lens, a mirror, a photo detector, and the like FIG. 6 shows a table for comparing the characteristics of the optical fiber array of the embodiment 1 of FIG. 1 with those of the optical fiber arrays of Comparative Example 1 and Comparative Example 2. It is apparent that although Comparative Example 1 has a problem that the coated optical fiber 14 breaks, and Comparative Example 2 has a problem that the degree of parallelization of the optical axis decreases, the optical fiber array of FIG. 1 has an excellent structure capable of combining the prevention of breaking and a high degree of parallelization of the optical axis.

Moreover, an optical fiber array with the coated optical fiber tip 10 that is slantly polished was manufactured. Other configuration is the same as that of the optical fiber array of FIG. 1. FIG. 7 shows the cross sectional view. The substrate 1 and the coated optical fiber tip 10 are ground while the substrate 1 is in contact with the face of a grind stone of a grinder, at an angle of 3° with respect to the face. The end face of the coated optical fiber tip 10 is inclined from the direction perpendicular to the center axis of the coated optical fiber 14. This could reduce the reflective return light when light is emitted from the coated optical fiber tip 10, and suppress the reflection loss. Moreover, although the substrate 1 and the coated optical fiber tip 10 were polished at the same time, the coated optical fiber 14 may be caused to project from the surface of the substrate 1, and the projected tip may be buried and fixed with resin, and then the resin and the coated optical fiber tip may be polished at the same time. This case has an advantage that a margin for polishing the substrate does not need to be considered.

In addition, in Embodiment 1, the pitch at which the coated optical fibers 14 is arranged has been set to 1 mm vertically and 1 mm horizontally, the pitch may be changed suitably by changing the photomask pattern and thereby setting the position of the through-holes 41, 42, and 43. Moreover, the shape of the array also may be set freely, not only in a grid shape, but in a straight line, in a circumferential shape, or in an irregular array. The number of coated optical fibers to arrange may also be set suitably. Moreover, when the diameters of the optical fiber 8 of the coated optical fiber and of the protective coating 9 differ, the sizes of the parallel pores 51, 52, 53 and of the taper portions 61, 62, 63 may be changed to address this difference.

Moreover, although in Embodiment 1, the cross section of the parallel holes 51, 52, and 53, i.e., the hole shape, is circular, the cross section may be of a triangle, a square, or a polygon to which the optical fiber 8 and protective coating 9 of the coated optical fiber 14 touch internally. Moreover, the hole shape when a through-hole without a taper portion is employed is not limited to be circular, but may be of a triangle, a square, or a polygon. At this time, the difference between the diameter of the inscribed circle of the cross-sectional shape and the diameter of the coated optical fiber 14 is the region, in which the coated optical fiber 14 can move, and is the variation of the arranged positions. In this case, the diameter of the inscribed circle is set to be equal to the diameter of the parallel pore or through-hole in the present invention. Moreover, although the cross section of the taper portions 61, 62, 63 of this embodiment is square, the cross section may be of a circle, a triangle, and a polygon.

Embodiments 2, 3

For the reference of the pore shape, an optical fiber array in which the taper portion 61 of the first substrate is pyramid shaped and the bottom is a square of side length 140 μm (referred to as Reference Example 1), an optical fiber array in which the bottom is a square of side length 80 μm (referred to as Reference Example 2), and an optical fiber array in which the bottom is a square of side length 110 μm (referred to as Reference Example 3) were manufactured. The parallel pore 51 is in common, and the cross section is a circle with the diameters of 126 μm, which is the same as that of Embodiment 1. FIGS. 8A-8D are front views of the first substrate viewed from the fiber inserting side, i.e., viewed from the second substrate, FIG. 8A shows Embodiment 1, FIG. 8B shows Reference Example 1, FIG. 8C shows Embodiment 2, and FIG. 8D shows Embodiment 3.

In Reference Example 1, the diameter of the cross section of the parallel pore 51 is smaller than the diameter of the inscribed circle of a square at the bottom of the taper portion 61, and a part of the bottom face of the taper portion 61 remains as to surround the edge of the circle of the parallel pore. Because a part of this bottom face is perpendicular to the coated optical fiber, during insertion of coated optical fibers the part becomes a hung-up portion to prevent the insertion or to chip off the coated optical fiber tip 11.

In Embodiment 2, the diameter of the cross section of the parallel pore 51 is larger than the diameter of the inscribed circle of a square at the bottom of the taper portion 61 and is larger than the diameter of the circumscribed circle. The edge of the square at the bottom of the taper portion 61 disappears and only the edge of the circle of the parallel pore is visible. With this shape, the bottom face of the taper portion 61 does not remain and thus the inserting of coated optical fibers is easy. However, when preparing the parallel pore by etching, the inclined face of the taper portion 61 also has to be passed through, and thereby an etching residue or burr occur, which is not preferable.

In Embodiment 1, a square at the bottom of the taper portion 61 is 126 μm square, the diameter of 126 μm of the cross section of the parallel pore 51 and the diameter of the inscribed circle of the former agree and the both are contiguous to each other. Although a part of the bottom face remains at four corners of the square of the taper portion 61, the insertion of an coated optical fiber was easy. Because only the bottom face of the taper portion 61 is passed through when preparing the parallel pore, neither an etching residue nor burr will occur.

In Embodiment 3, although the diameter of the cross section of the parallel pore 51 is larger than the diameter of the inscribed circle of a square at the bottom of the taper portion 61, it is smaller than the diameter of the circumscribed circle. Although a part of the bottom face remains at four corners of the square of the taper portion 61, the insertion of an coated optical fiber was easy. Although the inclined face of the taper portion 61 is passed through when preparing the parallel pore, the area thereof is small and thus neither an etching residue nor burr occurred.

From the foregoing, for the convenience of workability in inserting an coated optical fiber and in preparing the through-hole, it is preferable that the diameter of the cross section of the parallel pore 51 is equal to the diameter of the inscribed circle of the square at the bottom of the taper portion 61, or is larger than the diameter of the inscribed circle of the square at the bottom of the taper portion 61 and is smaller than the diameter of the circumscribed circle.

Embodiment 4

Moreover, in Embodiment 1, the optical fiber 8 and protective coating 9 of the coated optical fiber 14, and the through-holes 41, 42, and 43 are fixed by adhesive. Apart from this, an optical fiber array was prepared in the same way as Embodiment 1 except that the optical fiber 8 and the through-hole 41 are not fixed by adhesive (Embodiment 4). In Embodiment 4, the gap between the optical fiber 8 of the coated optical fiber 14 and the parallel pore 51 of the through-hole 41 is as extremely small as 1 μm and the optical fiber 8 is fitted therein, and thus the optical fiber 8 is fixed to the parallel pore 51 even without using adhesive. In this case, it is possible to prevent that the adhesive goes around to the coated optical fiber tip 10 to interfere with the emission of light, and further there is an advantage because the step of dripping adhesive may be saved. However, when the gap between the optical fiber 8 of the coated optical fiber 14 and the parallel pore 51 of the through-hole 41 is large, the movable range is large and inadequate and thus adhesive needs to be dripped.

Embodiment 5

Moreover, in Embodiment 1, a silicon oxide film 20 is formed on the surface of the first to third substrates, and thus the wetness of the adhesive is excellent and a strong immobilization is obtained. For the purpose of reference, an optical fiber array that does not have silicon oxide film in the substrate surface (Reference Example 1), and an optical fiber array in which silicon oxide film is formed only on the wall face of the through-hole by photolithography (Embodiment 5) were prepared. FIGS. 9A-9C are the cross sectional views of the substrate and the through-hole, FIG. 9A shows Embodiment 1, FIG. 9B shows Reference Example 2, and FIG. 9C shows Embodiment 5.

In Reference Example 2, when the adhesive was dripped to the taper hole portion, a part thereof became droplet, moved to other through-hole, thus causing a problems of plugging the through-hole. Because the surface of silicon is highly water repellent, the surface might have repelled the adhesive, facilitating the move of the adhesive from the dripped place.

In Embodiment 1, a part of the dripped adhesives did not move to other through-hole to plug. In Embodiment 5, the adhesive that overflowed the taper hole portion returned to the taper hole portion autoregulatorily, and did not move to other through-hole to plug. This may explain that while the substrate surface outside the taper hole portion is made of silicon whose wettability is poor and thus the adhesive is repelled, the taper hole portion has silicon oxide film 20 formed therein and is excellent in wettability and thereby the adhesive moved autoregulatorily.

From the viewpoint of obtaining strong immobilization by adhesive, silicon oxide film 20 may be formed both in the inside of the through-hole and in the substrate surface, as shown in FIG. 9A. However, silicon oxide film 20 is preferably formed only in the inside of the through-hole in terms of the workability in dripping the adhesive, as shown in FIG. 9O. This is advantageous when the through-hole is formed at a narrow pitch.

Moreover, although in Embodiment 1 the optical fiber 8 and protective coating 9 of the coated optical fiber 14, and the through-holes 41, 42, and 43 are fixed by adhesive, they may be fixed by silver paste or solder. If fixed by solder, swelling due to humidity will not occur and a strong immobilization will be obtained. In this case, metal film is applied to the optical fiber 8 and protective coating 9 of the coated optical fiber to improve the solder wettability.

Figure 10:
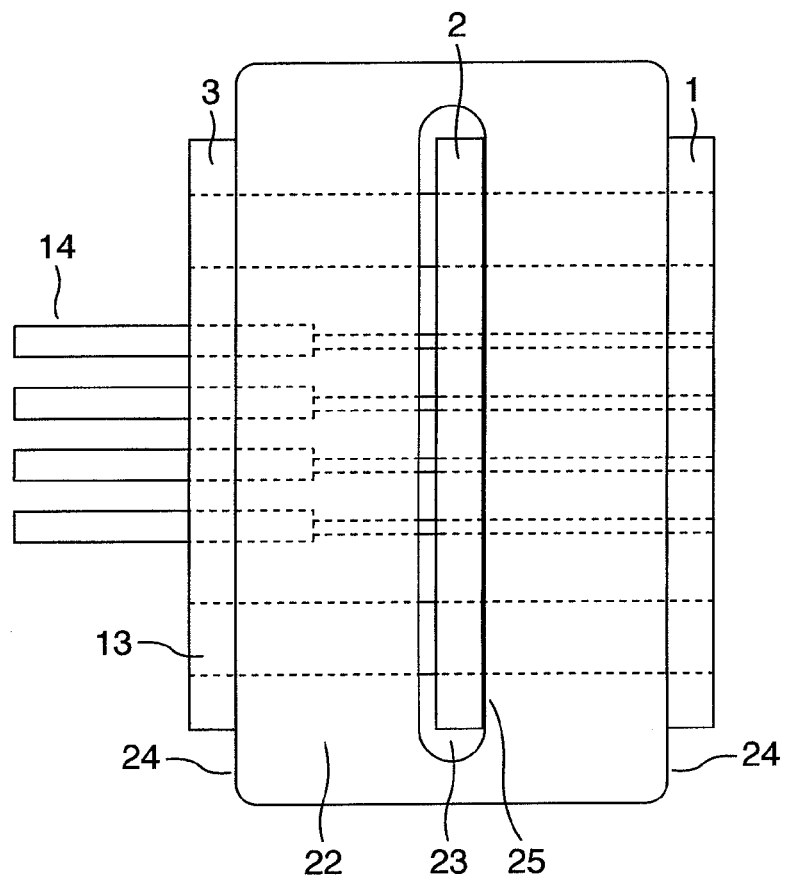
FIG. 10 is a schematic top view of an optical fiber array of another embodiment of the present invention.

Moreover, an optical fiber array was prepared by fixing the first to third substrates by means of a holding member 22 having two opposing surfaces 24 and a slit 23 provided therebetween. FIG. 10 shows the schematic top view. The first substrate 1 and the third substrate 3 are fixed to the opposing surfaces 24 by adhesive, respectively. The second substrate 2 is inserted into the slit 23 to fix to a wall face 25 of the slit. The order of the substrates is from the third substrate 3, to the second substrate 2, and to another substrate 1 in the direction of inserting the coated optical fiber, and two opposing surfaces 24 and the wall face 25 of the slit are approximately in parallel so that the substrates may not incline to each other. In the case where the through-hole on the substrate has a taper portion, the right side and back side are determined so that the direction to which the taper portion extends may face to the source position for inserting an coated optical fiber, and so that the taper portion may serve as a guide when inserting an coated optical fiber. The first to third substrates are provided with a positioning hole (not shown), and are positioned by inserting a positioning pin. This allows the through-holes used for coated optical fibers formed in each substrate to be opposingly arranged and thereby allows for the linear insertion of the coated optical fibers. In addition, although in the holding member there are formed (not shown) a hole for housing the positioning pin and a hole for housing coated optical fibers, these have large clearances with respect to the positioning pin and the coated optical fibers, and do not perform the function of immobilization or positioning.

As compared with the case where two or more spacers are used, the holding member 22 may reduce the number of members to one and achieve low cost. Moreover, in the case where two or more spacers are used, the structure is such that the substrates are alternatively stacked via spacers, which structure exhibits low rigidity and thus has a problem that it deforms during the impact test or high temperature test, however, the structure using the holding member 22 has high rigidity because all the substrates are fixed to one member, so that the deformation may be suppressed to small value.

Embodiment 6

Figure 11:
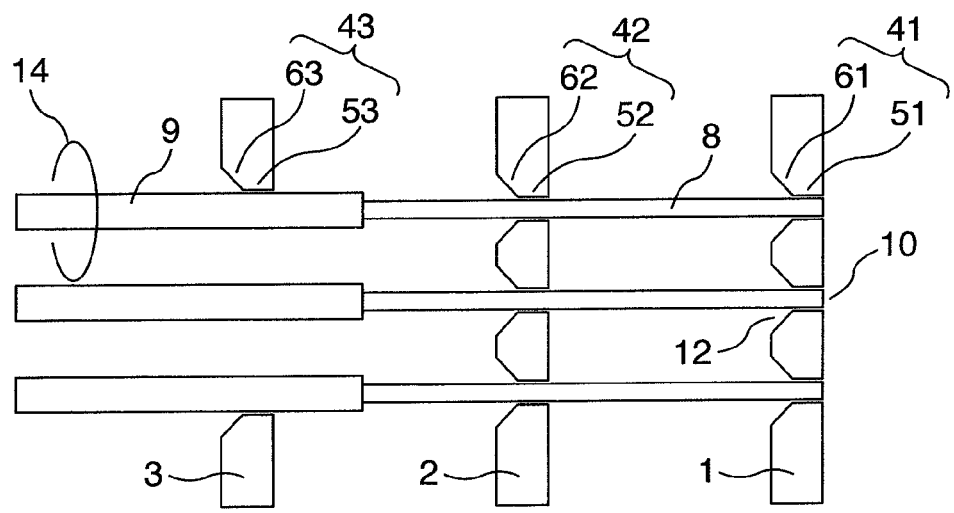
FIG. 11 is a schematic view of a cross section of an optical fiber array of another embodiment of the present invention.

FIG. 11 is a cross sectional view showing another example of the optical fiber array concerning an embodiment of the present invention. The arrangement pitch of the coated optical fiber 14 is 0.4 mm vertically and 1 mm horizontally, and a total of 24 coated optical fibers, 3 pieces vertically by 8 pieces horizontally, are arranged in high density. The method of positioning the substrates, and the like, are the same as Embodiment 1.

Because in Embodiment 6, the vertical pitch is as small as 0.4 mm, if the shape of the through-holes 41, 42, and 43 are made the same as that of Embodiment 1, an inconvenience may occur that the opening 12 (700 μm square) of the taper portion 63 of the through-hole 43 of the third substrate 3 overlaps with the adjacent hole. However, this could be resolved by employing the following configuration.

Figure 12:
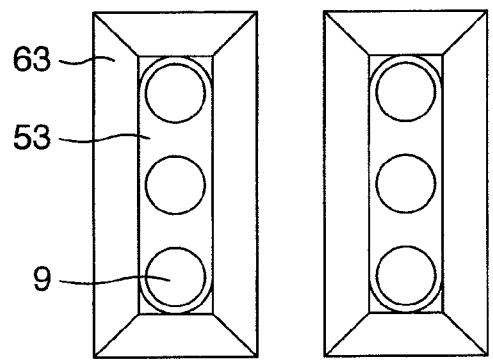
FIG. 12 is a schematic front view of the substrate of the optical fiber array of FIG. 11.

In Embodiment 6, the through-hole 43 of the third substrate is a slit shaped through-hole, the slit shaped through-hole is formed so that a plurality of through-holes 42 of the second substrate 2 may be opposingly arranged with respect to one slit shaped through-hole, and each coated optical fiber 14 inserted into a plurality of through-holes 42 of the second substrate 2 is inserted into the opposingly arranged slit shaped through-hole. More specifically, the hole shape of the parallel pore 53 of the through-hole 43 formed in the third substrate 3 is a through-hole whose hole shape is ellipse, i.e., a slit shaped through-hole, into which three coated optical fibers 14 are inserted. Three coated optical fibers 14 each inserted into three through-holes 42 of the second substrate 2 are inserted into one opposingly arranged slit shaped through-hole. In Embodiment 6, eight slit shaped through-holes, into each of which through-holes three coated optical fibers 14 are inserted, are formed in an array in the slit width direction, and the entire optical fiber array is constituted using this configuration. FIG. 12 is a front view of the substrate 3, and is a schematic view seen from the direction of the taper portion 63. That is, the cross section of the parallel pore 53 is 1070 μm vertically (major axis) by 270 μm horizontally (minor axis) and is a combined shape of a rectangular and a semicircle, wherein the taper portion 63, whose opening 12 is a rectangular, 1500 μm vertically by 700 μm horizontally, is pyramid shaped. The length in the horizontal direction of the slit shaped parallel pore, i.e., the minor axis of the slit, is larger than the diameter of 250 μm of the protective coating 9 by 20 μm, so that the deviation in this direction could be suppressed to 20 μm or less. The inserted three coated optical fibers 14 are fixed to the through-hole 43 of the third substrate 3 by adhesive at the protective coating 9 portion.

This allowed for the arrangement at a narrow pitch of 0.4 mm without damaging the function to lead the tip of the coated optical fiber. Because the through-hole 43 of the third substrate 3 is a slit shaped through-hole, the coated optical fiber may move in the major axis direction of the slit, and the gap produced between the protective coatings 9 at this time, is the largest when the coated optical fibers are deviated, two coated optical fibers being on one side and one coated optical fiber on the other side, and thus the gap in the major axis direction becomes 320 μm. This is two times or less the diameter of the protective coating 9. Although the coated optical fiber 14 is bent to some extent due to the deviation, the bending loss did not occur. Moreover, the adhesive that is dripped for fixing the coated optical fiber was controlled so as not to fill in between three protective coatings 9 and so that the coated optical fibers may not be equally spaced autoregulatorily and incline to each other or deviate, and thus neither a breaking nor bending loss occurred.

The length in the horizontal direction of the parallel pore of the slit shaped through-hole, i.e., the length of the minor axis of the slit, is two times or less the diameter of 250 μm of the protective coating 9 of the coated optical fiber 14, so that it could be prevented that the adjacent coated optical fibers 14 in the parallel pore are replaced with each other to change the arrangement order.

Although in Embodiment 6, eight slit shaped through-holes are formed 3 at 1 mm pitch in the third substrate, these may be formed at unequal intervals and thus the arrangement thereof is optional. However, the slit shaped through-holes are opposingly arranged with respect to the through-holes of the first and second substrates so that the coated optical fibers may be inserted linearly. Moreover, when the protective coatings 9 of all the coated optical fibers 14 are inserted into one slit shaped through-hole, the gap produced between the protective coatings 9 increases, causing an inconvenience that the coated optical fiber 14 is bent to cause a loss or is broken. This is especially noticeable when arranging at unequal intervals, or when bundling the protective coatings 9 of all the coated optical fiber 14. These inconveniences could be prevented by forming a plurality of slit shaped through-holes like in Embodiment 6.

The adoption of the hole shape of Embodiment 6 allows the coated optical fibers to be arranged at a narrower pitch while preventing a bending loss or breaking of coated optical fibers. This may contribute to improvement in the degree of freedom to arrange, to improvement in the integration efficiency of coated optical fibers, and to miniaturization of the optical fiber array itself.

Embodiment 7

Figure 13:
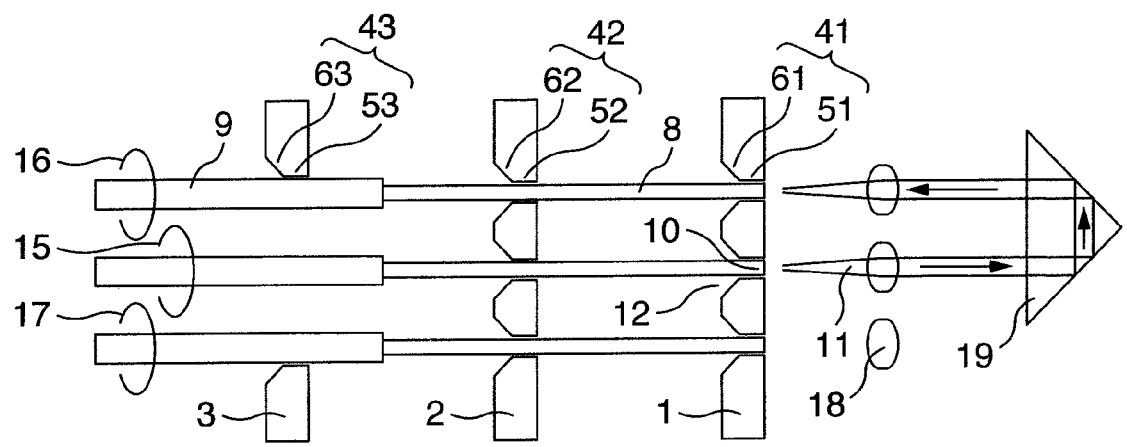
FIG. 13 is a schematic view of a cross section of an array type optical switch of an embodiment of the present invention.

FIG. 13 is a cross sectional view showing an example of an optical switch using the optical fiber array concerning the embodiment of the present invention. An optical fiber array with the same structure as that of Embodiment 6 is used. That is, the arrangement pitch of the coated optical fiber is 0.4 mm vertically and 1 mm horizontally, and a total of 24 coated optical fibers, 3 pieces vertically and 8 pieces horizontally, are arranged. FIG. 13 is a cross sectional view of a plane in which three coated optical fibers are aligned in parallel and eight coated optical fibers are aligned perpendicular to the plane of the sheet. The optical switch array comprises the optical fiber array, and a plurality of lenses 18, and a movable prism 19. A set of optical switch elements comprises three coated optical fibers, three lenses 18, and the movable prism 19 in the cross section of FIG. 13.

Let three coated optical fibers be an input coated optical fiber 15, an output-1 coated optical fiber 16, and an output-2 coated optical fiber 17. These are aligned in the order such that the output-1 coated optical fiber 16 and the output-2 coated optical fiber 17 may sandwich the input coated optical fiber 15. The lens 18 is opposingly arranged corresponding to the tip of the input coated optical fiber 15, the output-1 coated optical fiber 16, and the output-2 coated optical fiber 17, respectively. Furthermore, the movable prism 19 is arranged distant from the lens 18, viewed from the tip 10 of the coated optical fiber. The movable prism 19 comprises a mechanism that moves in the vertical direction on the view, i.e., in the direction that the input coated optical fiber 15, the output-1 coated optical fiber 16, and the output-2 coated optical fiber 17 are aligned in parallel. In FIG. 13, the movable prism 19 is located at the output-1 coated optical fiber 16 side. The movable prism 19 maintains a position in which the cross section thereof is a right angle isosceles triangle and the oblique side is perpendicular to the center axis of the coated optical fiber 11.

The switching operation (switching of the optical paths) is described using a set of optical switch elements shown in FIG. 13. A light that transmits through the input coated optical fiber 15 is emitted from the tip into the air (emitted light 11). The emitted light 11 passes through the lens 18 opposingly arranged to the input coated optical fiber 15 to turn into a parallel light, which is then incident upon the hypotenuse face of the movable prism 19. Furthermore, the emitted light 11 is reflected back by two planes forming a right angle inside the prism, and reaches the lens 18 opposingly arranged to the output-1 coated optical fiber 16 and is condensed there, and enters the output-1 coated optical fiber 16. That is, the light from the input coated optical fiber 15 enters and is optically coupled with the output-1 coated optical fiber 16.

Figure 14:
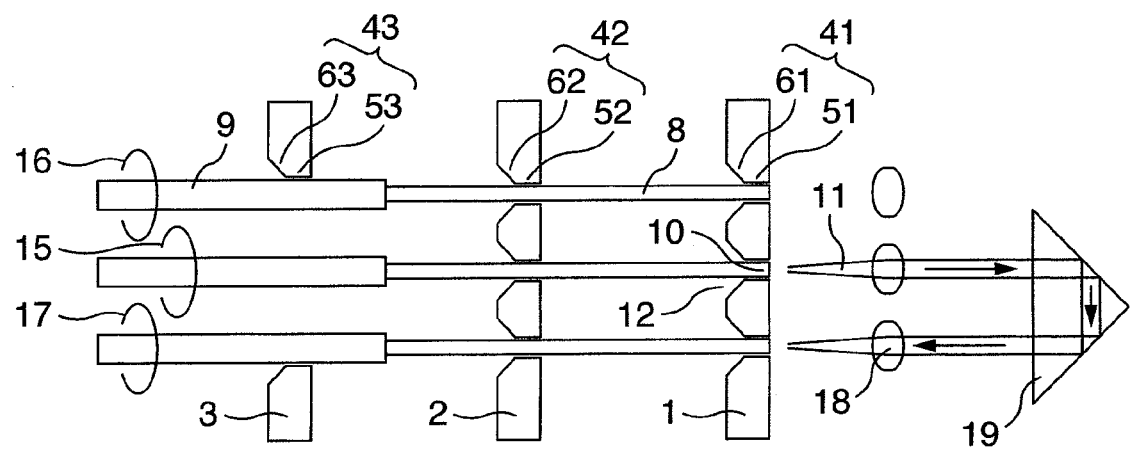
FIG. 14 is a schematic view of a cross section showing a situation in which the optical paths of the array type optical switch of FIG. 13 are switched.

The movable prism 19 is enabled to be located at the output-2 coated optical fiber 17 side. FIG. 14 is the schematic view. Similarly, the light that transmits through the input coated optical fiber 15 is emitted from the tip into the air (emitted light 11). The emitted light passes through the lens 18 opposingly arranged to the input coated optical fiber 15 to turn into a parallel light, which is then incident upon the hypotenuse face of the movable prism 19. Furthermore, the emitted light 11 is reflected back by two planes forming a right angle inside the prism, and reaches the lens 18 opposingly arranged to the output-2 coated optical fiber 17 and is condensed there, and then enters the output-2 coated optical fiber 17. That is, the light from the input coated optical fiber 15 enters and is optically coupled with the output-2 coated optical fiber 17.

By moving the prism, whether the light that transmits through the input coated optical fiber 15 is emitted to the output-1 coated optical fiber 16 or it is emitted to the output-2 coated optical fiber 17 may be changed, and thus the switching operation could be achieved. That is, one input coated optical fiber and two out coated optical fibers serve as a 1×2 optical switch element.

Embodiment 8

Figure 15:
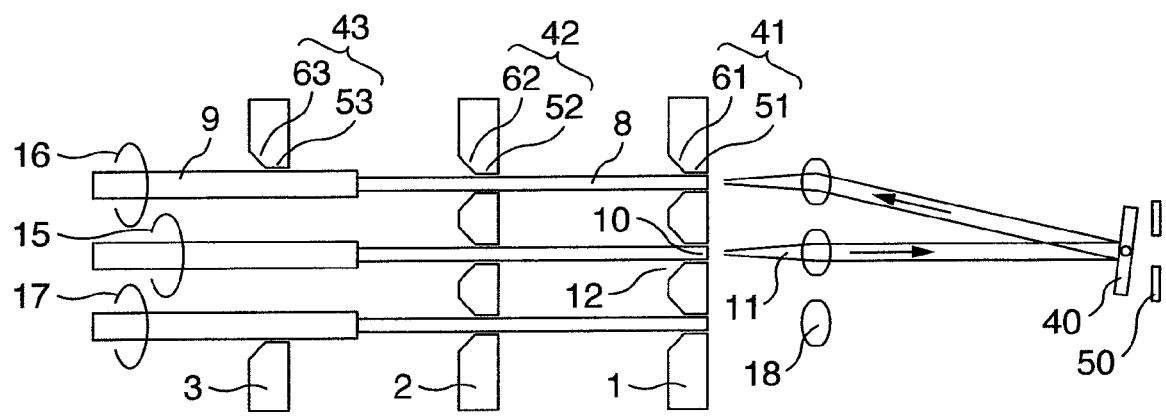
FIG. 15 is a schematic view of a cross section of an array type optical switch of another embodiment of the present invention.

FIG. 15 is a cross sectional view showing an example of an optical switch using the optical fiber array concerning the embodiment of the present invention, wherein a mirror 40 is used in place of the prism 19 of FIG. 14, and the arrangement of the lens 18 and mirror 40 is adjusted so that the reflected light may be incident upon the output-1 coated optical fiber 16 side, and other than this is the same as that of FIG. 14. The mirror 40 has a shaft that is along the direction perpendicular to the plane of the sheet, and the light reflected by inclining the mirror 40 about the shaft center is entered into the output-2 coated optical fiber 17 side, and thus the optical path could be switched. For the switching, a method is used in which an electrostatic attraction applied to the mirror 40 is adjusted by changing a voltage applied to a pair of electrodes 50 arranged approximately in parallel in the vicinity of the end of the back side (opposite side of the reflective plane) of the mirror 40, thereby changing the inclining direction of the mirror like a seesaw.

Furthermore, a plurality of optical switch elements may be constituted using the optical fiber array of the present invention. Specifically, a structure is achieved in which a combination of three coated optical fibers is stacked in the direction perpendicular to the plane of the sheet of FIG. 13. A plurality of optical switch elements may be constituted preparing the lens 18 corresponding to the three coated optical fibers each, and the movable prism 19. Specifically, when a structure in which the configuration of FIG. 13 is stacked in the direction perpendicular to the plane of the sheet was prepared, an optical switch having a high positional accuracy of the optical fiber array and capable of switching the optical paths in an optically low-loss condition was obtained.

Figure 16A:
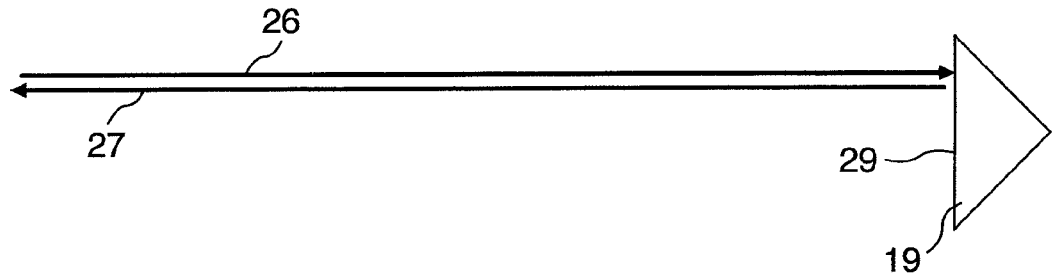
FIGS. 16A, 16B are schematic views explaining a method of positioning an optical fiber array with a prism in an embodiment of the present invention.
Figure 16B:
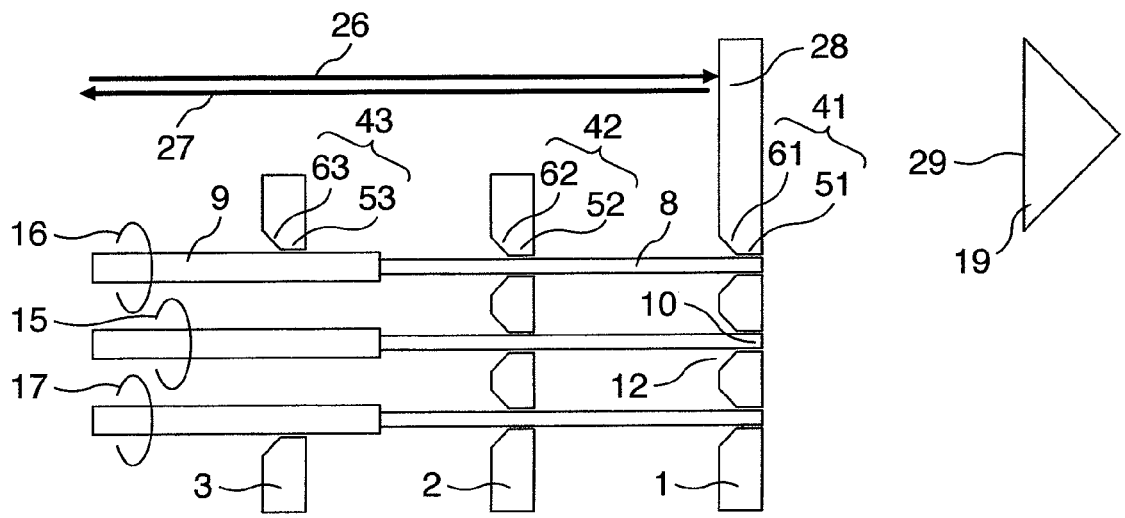

Moreover, as for the positioning of the optical fiber array and the prism in the optical switch, the alignment of parallelism by a point laser is carried out. FIGS. 16A, 16B show the schematic views. As shown in FIG. 16A, a point laser 26 is entered vertically into a hypotenuse face 29 of a prism, and a reflected light 27 is applied to a screen (not shown), and then this irradiation position is recorded (the position of each member is fixed). Next, an optical fiber array is placed opposite to the prism 19. As shown in FIG. 16B, the contour of the first substrate 1 of the optical fiber array is made larger than the contour of the second substrate 2 and the third substrate 3, and is provided with a reflection plane 28 to which the point laser 26 is applied. The reflected light 27 of the point laser reflected by the reflection plane 28 is applied to the screen, and the angle adjustment of the optical fiber array is carried out so that this irradiation position may be the same place as that at the time of the prism 19. When the holding member 22 of FIG. 10 was used, each coated optical fiber was vertically fixed to the first substrate 1 with sufficient accuracy, and this operation allowed each coated optical fiber to be perpendicular also to the hypotenuse face 29 of the prism 19 with sufficient accuracy. Furthermore, for accurate positioning, in addition to this alignment of parallelism, the adjustment of a total of four axes, i.e., three translation axes and one rotation axis about the center axis of the coated optical fiber, is required, however, if the alignment of parallelism were not carried out, the adjustment of a total of six axes, i.e., three translation axes and three rotation axes, would be required, and the operation would be more complicated. The alignment of parallelism may simplify the positioning operation.

Moreover, when a lens array substrate formed on the same substrate was used in place of the lens 18, the positioning operation could be simplified by providing a reflection position used for the point laser also in the lens array substrate and carrying out the same alignment of parallelism.

In the structure of Embodiment 6, the optical fiber array has eight coated optical fibers arranged in the direction perpendicular to the plane of the sheet, and thus a structure having eight 1×2 optical switch elements stacked could be achieved. That is, this is an optical switch array in which eight 1×2 optical switch elements are formed in an array.

The adopted optical fiber array suppresses a bending or breaking of coated optical fibers, so the reliability as an optical component could be improved. Moreover, because the pitch of the coated optical fibers of the optical fiber array is small, the miniaturization of the optical switch array is possible, and the occupied volume may be reduced as compared with the case where a plurality of stand alone 1×2 switches are arranged. Because each coated optical fiber of the optical fiber array is positioned with excellent accuracy, the degradation in the coupling loss due to the positional deviation is extremely small.

Embodiment 9

Figure 17:
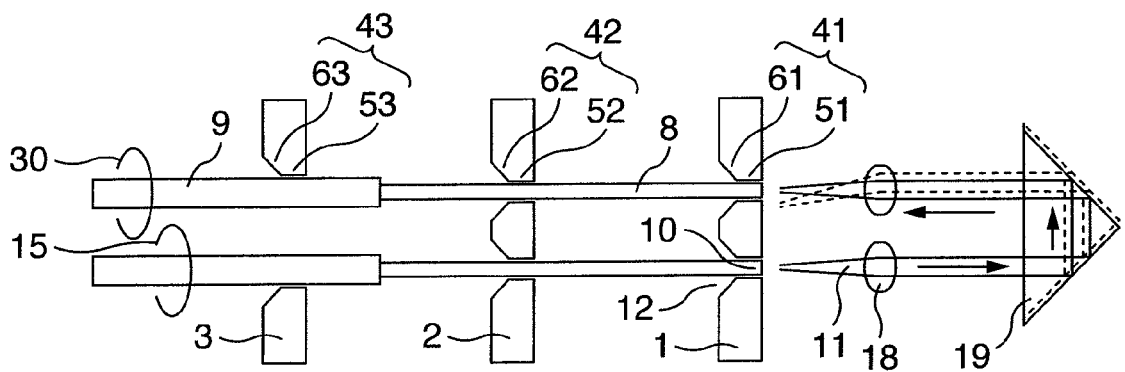
FIG. 17 is a schematic view of a cross section of an array type variable attenuator of an embodiment of the present invention.

FIG. 17 is a cross sectional view showing an example of a variable optical attenuator using the optical fiber array concerning the embodiment of the present invention. The optical fiber array is the one, in which a total of 16 coated optical fibers, two pieces vertically and eight pieces horizontally, are arranged, and other than this, the same structure as that of Embodiment 6 is used. The pitch of the arrangement of the coated optical fiber is 0.4 mm vertically and 1 mm horizontally. FIG. 17 is a cross sectional view of a plane in which two coated optical fibers are aligned in parallel, and eight coated optical fibers are aligned perpendicular to the plane of the sheet. The variable optical attenuator comprises the optical fiber array, the lens 18, and the movable prism 19. A set of variable optical attenuator elements comprises an array of two coated optical fibers, the lens 18, and the movable prisms 19 in the cross section of FIG. 16B.

Let two coated optical fibers be the input coated optical fiber 15 and an output coated optical fiber 30. The lens 18 is opposingly arranged corresponding to the tips of the input coated optical fiber 15 and the output coated optical fiber 30, respectively. Furthermore, the movable prism 19 is arranged distant from the lens 18, viewed from the coated optical fiber tip 10. The movable prism 19 comprises a mechanism that moves in the vertical direction on the view, i.e., in the direction that the input coated optical fiber 15 and the output coated optical fiber 30 are aligned in parallel. The movable prism 19 maintains a position in which the cross section thereof is a right angle isosceles triangle and the oblique side is perpendicular to the center axis of the coated optical fiber 11.

The operation for attenuating the quantity of light is described using a set of variable attenuator elements shown in FIG. 17. A light that transmits through the input coated optical fiber 15 is emitted from the tip into the air (emitted light 11). The emitted light 11 passes through the lens 18 opposingly arranged to the input light fiber 15 to turn into a parallel light, which is then incident upon the hypotenuse face of the movable prism 19. Furthermore, the emitted light 11 is reflected back by two planes forming a right angle inside the prism, and reaches the lens 18 opposingly arranged to the output coated optical fiber 30 and is condensed there, and then enters the output coated optical fiber 30. That is, the light from the input coated optical fiber 15 enters and is optically coupled with the output coated optical fiber 30.

Suppose that the movable prism 19 is enabled to move upwards to a position shown by a dotted line. Similarly, the light that transmits through the input coated optical fiber 15 is emitted from the tip into the air (emitted light 11). The emitted light that passes through the lens 18 opposingly arranged to the input coated optical fiber 15 to turn into a parallel light, which is incident upon the hypotenuse face of the movable prism 19. Furthermore, although the emitted light 11 is reflected back by two faces forming a right angle inside the prism and reaches the lens 18 opposingly arranged to the output coated optical fiber 30, the optical axis thereof is translated upwards as shown by a dotted line in FIG. 17. When the emitted light 11 enters the output coated optical fiber 30 after being condensed by the lens 18, a deviation of the condensing position occurs and thus the quantity of light entering the output coated optical fiber 30 changes as compared with the one before the displacement of the movable prism 19.

That is, by moving the movable prism 19, the quantity of light when causing the light that transmits through the input light fiber 15 to enter the output coated optical fiber 30 may be changed, so that the operation of a variable optical attenuator could be achieved.

Namely, the configuration shown in FIG. 17 serves as an element of the variable optical attenuator. Furthermore, a plurality of elements of the variable optical attenuator may be constituted using the optical fiber array of the present invention. Specifically, a structure is achieved in which a combination of two coated optical fibers is stacked in the direction perpendicular to the plane of the sheet of FIG. 16. A plurality of elements of the variable optical attenuator may be constituted by preparing the lenses 18 corresponding to two coated optical fibers, and the movable prism 19. Specifically, a structure could be achieved in which the configuration of FIG. 17 is stacked in the direction perpendicular to the plane of the sheet.

Moreover, like in the optical switch array, by providing a reflection position of the point laser in the first substrate 1 of the optical fiber array, the alignment of parallelism with respect to the prism 18 may be carried out.

The adopted optical fiber array suppresses a bending or breaking of coated optical fibers, so the reliability as the variable optical attenuator may be improved. Moreover, because the pitch of the coated optical fibers of the optical fiber array is small, the miniaturization of the variable optical attenuator is possible, and the occupied volume may be reduced as compared with the case where a plurality of stand alone variable optical attenuators are arranged. Because each coated optical fiber of the optical fiber array is positioned with excellent accuracy, the degradation in the coupling loss and a variation in the quantity of light in steady state due to a positional deviation is extremely small.

The above-described embodiments are array type optical switches having a plurality of optical switch elements, and an array type variable optical attenuator having a plurality of variable optical attenuator elements, however, array type optical components having a plurality of elements, such as a multiplexer, a demultiplexer, and an amplifier, may be constituted using the optical fiber array of the present invention, and high reliability, reduction in size and low-loss may be achieved It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical fiber array comprising:
   a plurality of optical fibers each having a coated portion coating said optical fibers and a non-coated portion; and
   a first substrate, second substrate, and third substrate that have one or more through-holes for inserting said optical fibers;
   wherein said substrates are arranged in the order of the first substrate, the second substrate, and the third substrate so that the through-holes of the first substrate, the second substrate and the third substrates are opposed to each other;
   wherein said optical fibers are inserted into the one or more through-holes of said opposingly arranged first substrate, second substrate, and third substrate; and
   wherein the one or more through-holes of said first and second substrates support the non-coated portion of the optical fibers, and the one or more through-holes of said third substrate support the coated portions of the optical fibers;
   wherein a material of at least said first substrate is silicon, and a silicon oxide film is formed only on a surface of a wall of each of the through holes of at least said first substrate at each of the through-holes thereof.

2. The optical fiber array according to claim 1, wherein a thickness of said first substrate and said second substrate is less than or equal to ten times a diameter of the optical fiber to be inserted.

3. The optical fiber array according to claim 1, wherein a thickness of said first substrate and a second substrate is not less than two times a diameter of the optical fiber to be inserted.

4. The optical fiber array according to claim 1, wherein a thickness of said third substrate is larger than a diameter of the coated portion of said optical fiber to be inserted and not larger than ten times said diameter of the coated portion.

5. The optical fiber array according to claim 1,
   wherein each of the one or more through-holes of said first substrate and second substrate has
   a parallel portion and a tapered portion connected to an end of said parallel portion and extended toward a surface of the first and second substrate;
   wherein a depth of said parallel portion is in the range from two times to ten times of a diameter of the optical fiber.

6. The optical fiber array according to claim 5, wherein a diameter of each of the one or more through-holes which said first substrate has or a diameter of the parallel portion of each of the one or more through-holes is larger than the diameter of the optical fiber by 0.1 to 30 μm.

7. The optical fiber array according to claim 5, wherein a diameter of each of the one or more through-holes which said second substrate has or a diameter of the parallel portion of each of the one or more through-holes is larger than the diameter of the optical fiber by 0.1 to 30 μm.

8. The optical fiber array according to claim 1, wherein the through-hole which said third substrate has comprises:
   a parallel portion and a tapered portion connected to an end of said parallel portion and extended toward a surface of the third substrate;
   wherein a depth of said parallel portion is larger than a diameter of the coated portion of said optical fiber and not larger than ten times said diameter of the coated portion.

9. The optical fiber array according to claim 1, wherein a diameter of the one or more through-holes which said third substrate has or a diameter of the parallel portion of the one or more through-holes is larger than a diameter of the coated portion of said optical fiber by 10 μm or more, and is smaller than two times the diameter of said coated portion of the optical fiber.

10. The optical fiber array according to claim 1, wherein a plurality of slit shaped through-holes which said third substrate has are formed spaced apart to each other on said third substrate.

11. The optical fiber array according to claim 10, wherein a minor axis of the slit shaped through-hole which said third substrate has is smaller than two times a diameter of the coated portion of the optical fiber, and is larger than the diameter of the coated portion by 10 μm or more.

12. The optical fiber array according to claim 11, wherein a gap produced between the plurality of coated portions of the optical fibers inserted into said slit shaped through-hole is two times or less the diameter of the coated portion of the optical fiber.

13. The optical fiber array according to claim 10, wherein a plurality of slit shaped through-holes are formed in said third substrate so that long major axes of the plurality of slit shaped through holes are arranged in parallel with each other, each of the plurality of coated portions of said optical fibers is arranged in a line in the direction of the long major axis in each of said slit shaped through holes, and the plurality of coated portions of said optical fibers are fixed to inner surfaces of the slit shaped through-holes with adhesive.

14. The optical fiber array according to claim 1, wherein a space between said first substrate and second substrate is in the range from 1 mm to 10 mm.

15. The optical fiber array according to claim 1, wherein in addition to said one or more through-holes, a positioning pin hole is opposingly arranged in said first to third substrates so that a positioning pin may be inserted.

16. The optical fiber array according to claim 1, further comprising a holding member in which two opposing surfaces and a slit provided therebetween are formed, wherein said first substrate and third substrate are fixed to the opposing surfaces of said holding member, and said second substrate is fixed to a inner-wall face of the slit.

17. An optical component using a plurality of optical fibers, wherein the optical fiber array according to claim 1 is used as said plurality of optical fibers.

18. An optical switch, comprising a plurality of optical fibers, the optical switch being for switching an optical path between said optical fibers, wherein the optical fiber array according to claim 1 is used as said plurality of optical fibers.

19. The optical fiber array according to claim 1, wherein a plurality of slit shaped through-holes are formed in said third substrate so that long major axes of the plurality of slit shaped through holes are arranged in parallel with each other, each of the plurality of coated portions of said optical fibers is arranged in a line in the direction of the long major axis in each of said slit shaped through holes, and the plurality of coated portions of said optical fibers are fixed to inner surfaces of the slit shaped through-holes with adhesive.

20. The optical fiber array according to claim 1, further comprising a holding member in which two opposing surfaces and a slit provided therebetween are formed, wherein said first substrate and third substrate are fixed to the opposing surfaces of said holding member, and said second substrate is fixed to an inner-wall face of the slit.

21. The optical fiber array according to claim 1, wherein each of through-holes of said first substrate and second substrate has a parallel portion and a tapered portion connected to an end of said parallel pore and extended toward a surface of said first substrate and said second substrate, wherein a cross section of the parallel portion is a circular shape, a cross section of the tapered portion is a square shape, and a diameter of inscribed circuit of the square shape of the cross section at a bottom of the tapered portion is larger than a diameter of the cross section of the parallel portion.

* * * * *